US008359050B2

(12) United States Patent
Okuda et al.

(10) Patent No.: US 8,359,050 B2
(45) Date of Patent: Jan. 22, 2013

(54) MOBILE PHONE

(75) Inventors: Kei Okuda, Higashihiroshima (JP); Yasuhiro Kawauti, Higashihiroshima (JP); Toshio Suganuma, Higashihiroshima (JP); Yuko Banba, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/300,140

(22) Filed: Nov. 18, 2011

(65) Prior Publication Data
US 2012/0129555 A1 May 24, 2012

Related U.S. Application Data

(62) Division of application No. 12/094,546, filed as application No. PCT/JP2006/322170 on Nov. 7, 2006, now Pat. No. 8,285,333.

(30) Foreign Application Priority Data

Nov. 22, 2005 (JP) ................................. 2005-336982
Nov. 24, 2005 (JP) ................................. 2005-337937
Nov. 24, 2005 (JP) ................................. 2005-339458

(51) Int. Cl.
*H04W 4/00* (2009.01)
(52) U.S. Cl. ..................... 455/466; 348/14.07; 725/43
(58) Field of Classification Search .................. 455/466, 455/556.1, 3.01, 3.06, 566, 550.1, 66.1, 412.1, 455/412.2, 414.1, 571.1–571.3; 348/14.07, 348/14.03, 553; 725/43, 141, 115, 117, 137; 379/265.09; 345/169
See application file for complete search history.

(56) References Cited

U.S. PATENT DOCUMENTS

| 6,529,742 | B1 | 3/2003 | Yang |
| 7,962,854 | B2 * | 6/2011 | Vance et al. .................. 715/753 |
| 2004/0078814 | A1 * | 4/2004 | Allen .............................. 725/47 |
| 2004/0137940 | A1 * | 7/2004 | Matsunami ............... 455/550.1 |
| 2005/0130715 | A1 | 6/2005 | Fujisawa |
| 2005/0210146 | A1 | 9/2005 | Shimizu |
| 2006/0020991 | A1 | 1/2006 | Goto |
| 2006/0212905 | A1 * | 9/2006 | Matsuda et al. ............... 725/51 |

(Continued)

FOREIGN PATENT DOCUMENTS
EP 1 271 897 A2 1/2003
(Continued)

OTHER PUBLICATIONS

Partial translation of JP-11-168534-A dated Jun. 22, 1996.

*Primary Examiner* — Nay A Maung
*Assistant Examiner* — Angelica Perez
(74) *Attorney, Agent, or Firm* — Birch, Stewart, Kolasch & Birch, LLP

(57) ABSTRACT

A mobile phone which allows a user to continuously watch a television broadcast even if there is a call from the other party phone is provided. If a call comes from the other party phone in a state of displaying television image on a main display, the television audio output part 36 stops outputting television audio corresponding to the television image while the television image display part maintains display of the television image on the main display, wherein the character information display part 38 causes the main display to display caption corresponding to the television image. Therefore, the user is allowed to continuously watch the television broadcast on the basis of the television image and caption while communicating with the other party phone.

6 Claims, 23 Drawing Sheets

U.S. PATENT DOCUMENTS

2007/0002018 A1 * 1/2007 Mori .................... 345/158

FOREIGN PATENT DOCUMENTS

| | | | |
|---|---|---|---|
| EP | 1 542 433 A1 | 6/2005 | |
| EP | 1 601 193 A1 | 11/2005 | |
| EP | 1601193 | * 11/2005 | |
| JP | 7-30872 A | 1/1995 | |
| JP | 11-168534 A | 6/1999 | |
| JP | 2002-149301 A | 5/2002 | |
| JP | 2002-152078 A | 5/2002 | |
| JP | 2004-186716 A | 7/2004 | |
| JP | 2004-201126 A | 7/2004 | |
| JP | 2004-215180 A | 7/2004 | |
| JP | 2005-12344 A | 1/2005 | |
| JP | 2005-130132 A | 5/2005 | |
| JP | 2005-130133 A | 5/2005 | |
| JP | 2005-151338 A | 6/2005 | |
| JP | 2005-168038 A | 6/2005 | |
| JP | 2005-198259 A | 7/2005 | |
| JP | 2005-242714 A | 9/2005 | |
| JP | 2005-2160741 A | 9/2005 | |
| JP | 2005-311533 A | 11/2005 | |
| JP | 2005-323031 A | 11/2005 | |
| WO | WO 03/081878 A1 | 10/2003 | |
| WO | WO2005/104505 A1 | 4/2004 | |

* cited by examiner

Fig.22
(a)
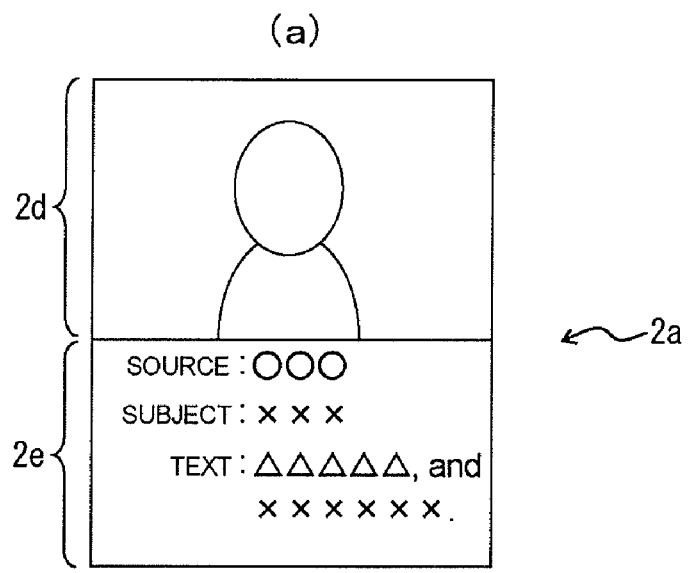
(b)
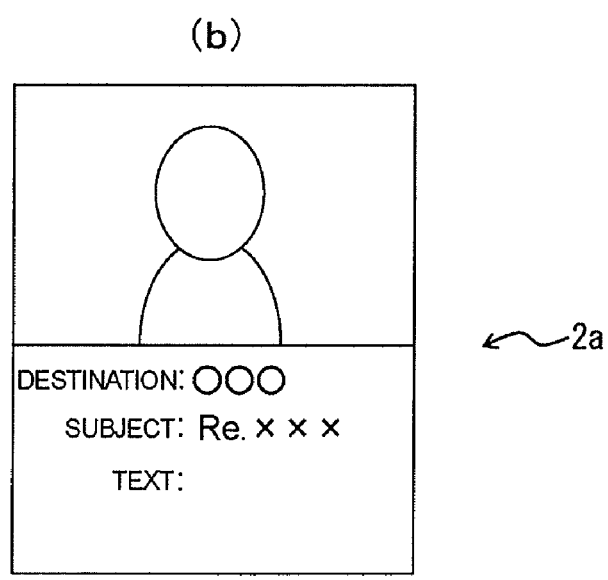

MOBILE PHONE

This application is a Divisional of U.S. patent application Ser. No. 12/094,546 filed on May 21, 2008 now U.S. Pat. No. 8,285,333, which is a National Phase of PCT/JP2006/322170 filed on Nov. 7, 2006, which claims priority under 35 U.S.C. § 119(a) to Patent Application No. JP2005-336982(P) filed in Japan on Nov. 22, 2005, to patent Application No. JP2005-337937(P) filed in Japan on Nov. 24, 2005 and to Patent Application No. JP2005-339458(P) filed in Japan on Nov. 24, 2005, all of which are hereby expressly incorporated by reference in their entirety.

BACKGROUND OF THE INVENTION

1. Field of the Invention

The present invention relates to a mobile phone, and more specifically the improvement in a mobile phone which allows users to view television broadcasts.

2. Description of Related Art

Some of mobile phones are provided with an antenna which receives television broadcast waves transmitted from television stations, in which television images are displayed on a display screen and television audio corresponding to the television images is outputted on the basis of the television broadcast waves, thereby a user is allowed to view television broadcasts (refer to Patent Documents 1 and 2 for example).

External output device, such as a speaker incorporated in a mobile phone to amplify and output television audio, and earphones to be connected to an external output terminal which is provided in a mobile phone, is used as audio output means for outputting television audio. When a user views a television broadcast at home or in an environment where no one is around, or when several friends get together to view a television broadcast, television audio can be outputted from a speaker. On the contrary, on a train or in an environment surrounded by many unspecified people, a user is allowed to view a television broadcast by outputting television audio via an external outputting device such as earphones without causing trouble to surrounding people.

Meanwhile, when the user talks over the telephone between the other party phone, voice from the other party phone can be heard by moving a receiver provided in a mobile phone close to an ear of the user. Voice from the other party phone can also be outputted from a speaker or an external outputting device in communication with the other party phone. In commonly used mobile phones in which television broadcasts can be received, users are thus allowed to call by selecting any one among a receiver, a speaker and an external output device, and to view television broadcasts by selecting either a speaker or an external device.

Mobile phones disclosed in Patent Documents 1 and 2 are provided with a display case created with a display screen and an operation case having an arrangement with a number of operation keys, in which the display case is rotatably held by the operation case within a face of horizontally disposing the display screen. Mobile phones of this type has, for example, the display screen created into a rectangular shape, in which the display case is rotated with respect to the operation case so as to use the display screen switched between a longitudinally extended state brought by setting a longitudinal direction of the display screen as a vertical direction, and the laterally extended state brought by setting a widthwise direction of the display screen as a vertical direction.

Since television images typically have a laterally extended aspect ratio, setting the display screen to the laterally extended state provides excellent display of television images. In contrast, when a user answers a call from the other party phone, the mobile phone is used by setting the display screen to a longitudinally extended state. Commonly used mobile phones are provided with a transmitting microphone for inputting voice at one end of the operation case in a longitudinal direction, and a receiver for outputting voice from the other party phone at one end of the display case in a longitudinal direction. Accordingly, a user moves the mobile phone close to the face by using the display screen in a longitudinally extended state while disposing the transmitting microphone close to the mouth and the receiver close to the ear, so that satisfactory communication can be realized.

As another example of mobile phones which allows users to view television broadcasts, mobile phones are proposed such that, when an electronic mail is received while viewing a television broadcast, a notification is displayed on a display screen for a user to confirm reception of the electronic mail without interrupting the user to view the television broadcast (e.g. refer to Patent Documents 3 and 4). In such mobile phones, users who confirmed reception of an electronic mail carry out a predetermined operation to start an application for browsing character information of the electronic mail, whereby full text of the electronic mail can be displayed for browsing on the display screen. If necessary, an operation is carried out to start an application for creating an electronic mail so as to create a reply electronic mail to a received electronic mail.

Patent Document 1: Japanese Unexamined Patent Publication No. 2004-215180
Patent Document 2: Japanese Unexamined Patent Publication No. 2005-12344
Patent Document 3: Japanese Unexamined Patent Publication No. 2005-130132
Patent Document 4: Japanese Unexamined Patent Publication No. 2005-198259

SUMMARY OF THE INVENTION

Problems to be Solved by the Invention

If there is a call from the other party phone while viewing a television broadcast in mobile phones which are capable of receiving television broadcasts as stated above, an operation needs to be carried out to answer the call after an operation to stop viewing the television broadcast is carried out. Accordingly, a call from the other party phone necessarily interrupts viewing of a television broadcast, where communication with the other party phone is not compatible with viewing a television broadcast.

Moreover, a direction of a display screen to allow satisfactory communication typically differs from a direction of the display screen to allow satisfactory viewing of television broadcasts. Accordingly, if there is a call from the other party phone while viewing a television broadcast on the display case disposed in a longitudinally extended state, operations need to be carried out to rotate the display case into a longitudinally extended state and to answer the call. On the contrary, if a user tries to view a television broadcast, operations need to be carried out to rotate the display case from a longitudinally extended state to the laterally extended state and to start viewing a television broadcast. In either case, troublesome operations are required.

Furthermore, since power consumed by the mobile phones to view a television broadcast is relatively high, it is preferable to discontinue display of television images or other images if not necessary in such a case as communicating with the other party phone. Also, in the case of answering a call from the other party phone while viewing a television broadcast, it is necessary to stop viewing the television broadcast, which causes a problem because a user is prevented from viewing the television broadcast thereafter.

In the conventional mobile phones as disclosed in Patent Documents 3 and 4, users are allowed to confirm reception of an electronic mail while viewing a television broadcast, in which it is impossible to confirm character information of the received electronic mail. Therefore, in order to confirm character information of an electronic mail, an application needs to be started to browse an electronic mail while interrupting viewing of a television broadcast, leaving problems such that a user is not allowed to browse through character information of an electronic mail while viewing a television broadcast.

The present invention was achieved in view of the above problems, and an object thereof is to provide a mobile phone which allows a user to continuously watch a television broadcast even if there is a call from the other party phone. Another object of the present invention is to provide a mobile phone in which conveniences can be improved. Yet another object of the present invention is to provide a mobile phone for reducing troublesome operations. A further object of the present invention is to provide a mobile phone which is capable of realizing efficient reduction of power consumption. The present invention also has an object to provide a mobile phone for improving conveniences when there is a call from the other party phone while viewing a television broadcast. The present invention has another object to provide a mobile phone which is capable of browsing through character information of an electric mail received while viewing a television broadcast.

Means Adapted to Solve the Problem

A mobile phone according to a first aspect of the present invention includes: television broadcast reception means adapted to receive a television broadcast wave; television output means adapted to display a television image on a display screen and to output television audio corresponding to the television image on the basis of received the television broadcast wave; radio communication means adapted to transmit/receive a call signal and a response signal; and incoming call response means adapted to generate the response signal and to establish a communication state on the basis of a user operation in a period answerable to the call signal, wherein the television output means includes: volume reduction means adapted to reduce a volume of television audio corresponding to the television image while maintaining display of the television image on the display screen when the call signal is received in a state of displaying the television image on the display screen; and character information display means adapted to extract character information corresponding to the television image from the television broadcast wave and to display the character information on the display screen when the volume reduction means reduces television audio corresponding to the television image.

According to such a structure, if there is a call from the other party phone in a state of displaying the television image on the display screen, communication can be made with the other party phone by reducing the volume of the television audio corresponding to the television image while maintaining display of the television image on the display screen. At this time, the character information such as caption corresponding to the television image can be displayed on the display screen, which allows a user to continuously watch the television broadcast based on the television image and the character information while communicating with the other party phone.

A mobile phone of a second aspect of the present invention includes: a case having the display screen created on a case face; first audio output means for use in a state of putting the case face on a user's ear; second audio output means for use in a state of keeping the case face away from the user's ear; and output selection means adapted to output voice from the other party phone by selecting the same audio output means used to output the television audio until then in the case of reducing a volume of the television audio corresponding to the television image by the volume reduction means.

If there is a call from the other party phone in a state of displaying the television image on the display screen, such a structure makes it possible to output voice from the other party phone by using the audio output means outputting the television audio at that time. Accordingly, an operation to switch the audio output means is not required to realize communication with the other party phone, and communication can be continuously made by the using audio output means which has been used until then, where conveniences are enhanced.

A mobile phone of a third aspect of the present invention is structured so that the television output means has image display stop means adapted to stop display of the television image on the display screen in the case of carrying out an operation to use the first audio output means to output voice from the other party phone when the second audio output means outputs the voice while maintaining display of the television image on the display screen.

Such a structure makes it possible to stop displaying the television image on the display screen on the basis of a user operation for outputting the voice by the first audio output means when the user watches the television image displayed on the display screen while outputting the voice from the other party phone by the second audio output means. Since the user has to put the ear to the case face for a telephone call, it becomes impossible to see the display screen, when the operation for outputting the voice by the first audio output means is performed, so that power consumption can be efficiently reduced by stopping the display of the television image automatically.

A mobile phone of a fourth aspect of the present invention includes recording means adapted to record subsequent television image on the basis of the television broadcast wave when the image display stop means stops displaying the television image.

Such a structure can enhance conveniences because the television broadcast interrupted to view due to stopped display on the display screen is recorded to allow the user to watch the television broadcast later.

A mobile phone of a fifth aspect of the present invention includes hold switching means adapted to switch to a holding state in which an output of communication voice to the other party phone is stopped in an established communication state, wherein the television output means has volume increase means adapted to increase a volume of the television audio when the holding switching means is used for switching to a holding state while the television image is displayed on the display screen in a reduced volume of the television audio.

According to such a structure, television audio can be temporarily heard by increasing a volume of the television audio in a holding state when a user desires to listen to television audio by judging from contents of the television image during communication with the other party phone while maintaining display of the television image on the display screen in a reduced volume of the television audio, so that conveniences improve further.

A mobile phone of a sixth aspect of the present invention includes: a display case having a rectangular display screen created on a case face; audio output means arranged within the display case on one end side of a longitudinal direction on the display screen and used in a state of putting the case face on the user's ear; holding means adapted to rotatably hold the display case within a face of horizontally disposing the display screen so that the display screen should be in a longitudinally extended state and a laterally extended state; rotational operation detection means adapted to detect a rotational operation of the display case by the user; television broadcast reception means adapted to receive television broadcast waves; television image display means adapted to cause the display screen to display television image generated on the basis of received television broadcast wave and rotated in accordance with the rotation operation; radio communication means adapted to transmit/receive a call signal and a response signal; and incoming call response means adapted to generate a response signal and to establish a communication state in a period answerable to the call signal on the basis of a rotational operation to make a transition of the display screen displaying the television image from a laterally extended state to a longitudinally extended state.

Such a structure makes it possible to answer a call by simply rotating the display case from the laterally extended state to the longitudinally extended state when the call signal is received in a state of displaying a television image on the display screen by setting the display case to the laterally extended state. Accordingly, if there is a call from the other party phone while viewing a television broadcast, the user is allowed to answer the call by simply rotating the display case, in which an operation to rotate the display case and an operation to answer the call are not both required and troublesome operations can be reduced.

A mobile phone of a seventh aspect of the present invention is configured so that the television image display means has image display stop means adapted to stop display of the television image on the display screen when the incoming call response means establishes the communication state.

Such a structure makes it possible to stop displaying the television image on the display screen on the basis of an operation to answer a call from the other party phone by rotating the display case. If the user answers a call by rotating the display case from the laterally extended state to the longitudinally extended state, the user has to put the case face of the display case on the ear to communicate, which prevents the user from seeing the display screen, so that power consumption can be efficiently reduced by stopping the display of the television image automatically.

A mobile phone of an eighth aspect of the present invention includes recording means adapted to record subsequent television image based on the television broadcast wave when the image display stop means stops displaying the television image.

According to such a structure, the television broadcast which was interrupted to view by stopped display on the display screen is recorded to allow the user to watch the television broadcast later. Accordingly, even if there is a call from the other party phone while viewing the television broadcast, the user is capable of answering the call to communicate without hesitation because of a relief knowing that the subsequent television broadcast is automatically recorded. Therefore, conveniences can be enhanced in the case of having a call from the other party phone while viewing a television broadcast.

A mobile phone of a ninth aspect of the present invention is structured so that the television image display means includes first image rotation means adapted to rotate display of a television image on the display screen at 90 degrees on the basis of a rotational operation to make a transition of the display screen displaying the television image from the laterally extended state to the longitudinally extended state when it is not in a period answerable to the call signal.

Such a structure makes it possible to adjust a direction of the television image to a rotational position by rotating the display of the television image on the display screen at 90 degrees in the case of rotating the display case from the laterally extended state to the longitudinally extended state while displaying the television image on the display screen when it is not in a period answerable to a call signal.

A mobile phone of a tenth aspect of the present invention is structured so that the television image display means has character information display means which displays the television image and character information extracted from the television broadcast wave to correspond to the television image on the display screen disposed in the longitudinally extended state.

Such a structure makes it possible to display character information such as caption corresponding to the television image in an open space created on the display screen resulting from a difference between a ratio of longitudinal and lateral lengths of the display screen and an aspect ratio of the television image. Accordingly, if the user desires to display character information, the character information can be displayed by simply rotating the display case to reach the longitudinally extended state, where conveniences can be further enhanced.

A mobile phone of an eleventh aspect of the present invention is structured so that the television image display means has image display start means adapted to cause the display screen to start displaying the television image on the basis of a rotational operation to make a transition of the display screen displaying no television image from the longitudinally extended state to the laterally extended state.

Such a structure makes it possible to automatically display the television image on the display screen by simply rotating the display case from the longitudinally extended state to the laterally extended state. Accordingly, when the user tries to view the television broadcast, an operation to rotate the display case and an operation to start displaying a television image are not both required, in which troublesome operations can be reduced.

A mobile phone of a twelfth aspect of the present invention is structured so that the television image display means has second image rotation means adapted to rotate display of the television image on the display screen at 90 degrees on the basis of a rotational operation to make a transition of the display screen displaying the television image from the longitudinally extended state to the laterally extended state.

Such a structure makes it possible to adjust a direction of the television image to the rotational position by rotating display of the television image on the display screen at 90 degrees when the display case is rotated from the longitudinally extended state to the laterally extended state while displaying the television image on the display screen.

A mobile phone of a thirteenth aspect of the present invention includes: television broadcast reception means adapted to receive a television broadcast wave; television image display means adapted to display television image on the display screen on the basis of the received television broadcast wave; electronic mail reception means adapted to receive an electronic mail made of character information from a base station; scroll display means adapted to provide scroll display so that the character information of the electronic mail moves on the display screen as time elapses when the electronic mail is received in a state that the television image display means displays the television image on the display screen; and application start means adapted to start an application to browse through character information of the received electronic mail or an application to create an electronic mail on the basis of an operation made by a user after the scroll display starts.

According to such a structure, when the electronic mail is received in a state of displaying the television image on the display screen, the character information of the received electronic mail can be subjected to the scroll display on the display screen while maintaining display of the television image, whereby the user is allowed to browse through character information of the received electronic mail while viewing the television broadcast. The scroll display of the character information of the received electronic mail on the display screen makes it possible to display full text of the electronic mail while securing a space to display the television image.

Accordingly, if the user confirms the character information of the received electronic mail in the scroll display while viewing the television broadcast and desires to immediately browse through full text of the mail or to create a reply electronic mail, the user carries out an operation to start an application. In contrast, if the user desires to give priority to view the television broadcast, the user may view the television broadcast without carrying out the aforementioned operation at that time and start the application later.

A mobile phone of a fourteenth aspect of the present invention is structured so that the application start means has mail browsing application start means which starts an application to browse through character information other than the character information already subjected to the scroll display on the display screen when said operation is carried out by the user prior to scroll display of entire character information of the received electronic mail on the display screen.

According to such a structure, if the user desires to immediately browse through full text of the received electronic mail in the middle of confirming character information thereof in the scroll display while viewing the television broadcast, the user carries out an operation to start an application for browsing through the character information other than the character information already subjected to the scroll display on the display screen prior to scroll display of entire character information of the received electronic mail on the display screen. This application is started to allow the user to browse through the character information other than the character information already subjected to the scroll display on the display screen, which makes it possible to browse full text of a received electronic mail in minimum display.

A mobile phone of a fifteenth aspect of the present invention is structured so that the application start means has mail creating application start means which starts an application to create a reply electronic mail to the received electronic mail when said operation is carried out by the user within a fixed period of time after entire character information of the received electronic mail is subjected to the scroll display on the display screen.

According to such a structure, if the user desires to create a reply electronic mail to the received electronic mail after confirming character information of the received electronic mail in the scroll display while viewing the television broadcast, the user carries out an operation within a fixed period of time after finishing scroll display so as to start an application to create a reply electronic mail. Accordingly, an operation to specify a mail address of a transmitting destination can be omitted, and a reply electronic mail can be easily transmitted.

A mobile phone of a sixteenth aspect of the present invention includes: a display case created with a rectangular display screen; holding means adapted to rotatably hold the display case within a face of horizontally disposing the display screen so that the display screen should be in the longitudinally extended state and the laterally extended state; and rotational operation detection means adapted to detect a rotational operation of the display case made by the user, wherein the television image display means causes the display screen to display the television image rotated in accordance with the rotational operation, and the application start means starts an application on the basis of a rotational operation to make a transition of the display screen from the laterally extended state to the longitudinally extended state.

Such a structure makes it possible to start the application for browsing through the character information of the received electronic mail or the application for creating the electronic mail on the basis of the operation to rotate the display case from the laterally extended state to the longitudinally extended state.

A mobile phone of a seventeenth aspect of the present invention is structured so that the television image display means continuously displays the television image on one side of a longitudinal direction on the display screen disposed in the longitudinally extended state after the application start means starts the application, and the application start means displays a screen for browsing or creating an electronic mail on the other side of the longitudinal direction on the display screen.

Such a structure allows a laterally extended the television image to be displayed on one side of the longitudinal direction on the display screen disposed in the longitudinally extended state while displaying the screen for browsing or creating an electronic mail in an open space created accordingly on the other end side of the longitudinal direction on the display screen.

Effects of the Invention

According to the present invention, in a case of having a call from the other party phone while displaying the television images on the display screen, communication with the other party phone can be made by reducing a volume of television audio corresponding to the television image while maintaining display of the television image on the display screen, where the character information such as caption corresponding to the television image can be displayed on the display screen, so that the user is allowed to continuously watch the television broadcast on the basis of the television image and the character information during communication with the other party phone.

In receiving a call from the other party phone while displaying the television image on the display screen, the present invention also makes it possible to make communication by continuously using the audio output means which has been used until then, where conveniences can be enhanced. Moreover, if the user desires to listen to television audio by judging from contents of the television image when communication is made with the other party phone with a reduced volume of the television audio while maintaining display of the television image on the display screen, it is possible to temporarily listen to the television audio by increasing a volume of the television audio in a holding state, so that conveniences can be further enhanced.

Furthermore, in the case of having a call from the other party phone while viewing the television broadcast, the present invention allows the user to answer to the call by simply rotating the display case, where the operation to rotate the display case and the operation to answer the call are not both required, so that troublesome operations can be reduced.

The present invention also enables efficient reduction of power consumption by automatically stopping display of the television image on the display screen on the basis of an operation to answer the call from the other party phone by rotating the display case.

In addition, the present invention makes it possible to record the television broadcast which was interrupted to view due to stopped display on the display screen, so as to allow the user to watch the television broadcast later, where conveniences can be enhanced in the case of having a call from the other party phone while viewing the television broadcast.

Moreover, according to the present invention, in receiving the electronic mail while displaying the television image on the display screen, the character information of the received electronic mail can be subjected to the scroll display on the display screen while maintaining display of the television image, whereby the user is allowed to browse through the character information of the received electronic mail while viewing the television broadcast.

If the user desires to immediately browse through full text of the received electronic mail in the middle of confirming character information thereof in the scroll display while viewing the television broadcast, the user carries out an operation prior to the scroll display of entire character information of the electronic mail on the display screen, whereby it is made possible to browse through the character information other than the character information already subjected to the scroll display on the display screen.

Meanwhile, if the user desires to create the reply electronic mail to the received electronic mail after confirming the character information of the received electronic mail in the scroll display while viewing the television broadcast, the user carries out an operation within a fixed period of time after finishing the scroll display, whereby an application can be started to create a reply electronic mail.

BRIEF DESCRIPTION OF THE DRAWINGS

FIG. 22 shows an example of an embodiment in which an application start part starts an application in accordance with an operation carried out by the user after scroll display starts.

DETAILED DESCRIPTION OF THE INVENTION

First Embodiment

Figure 1:
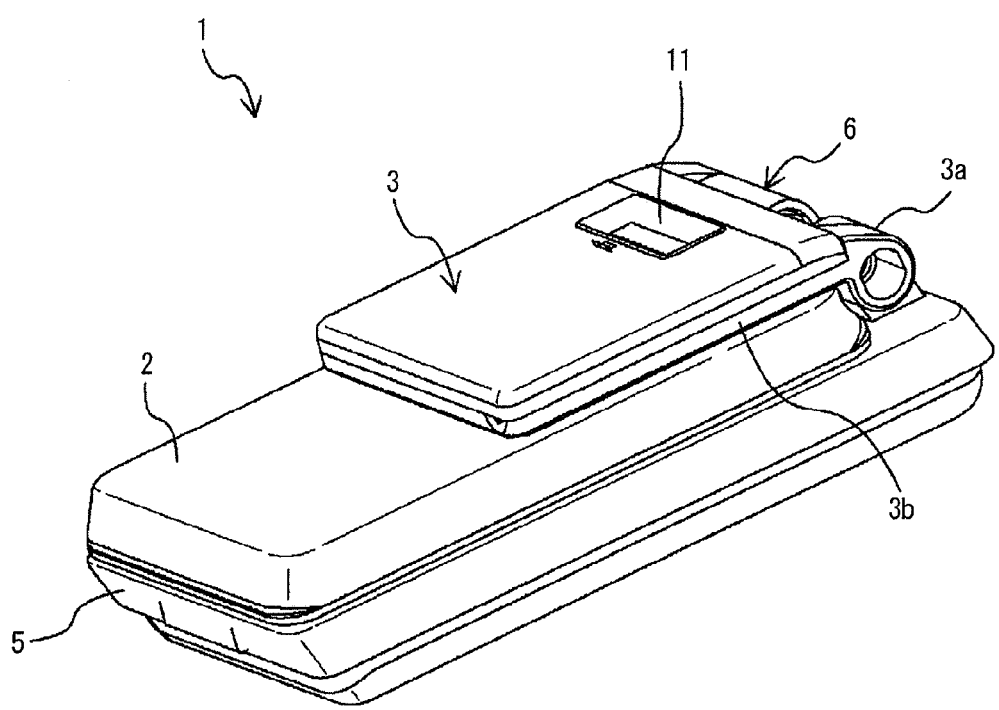
FIG. 1 is a perspective view showing an example of a mobile phone according to a first embodiment of the present invention, in which cases are closed.
Figure 2:
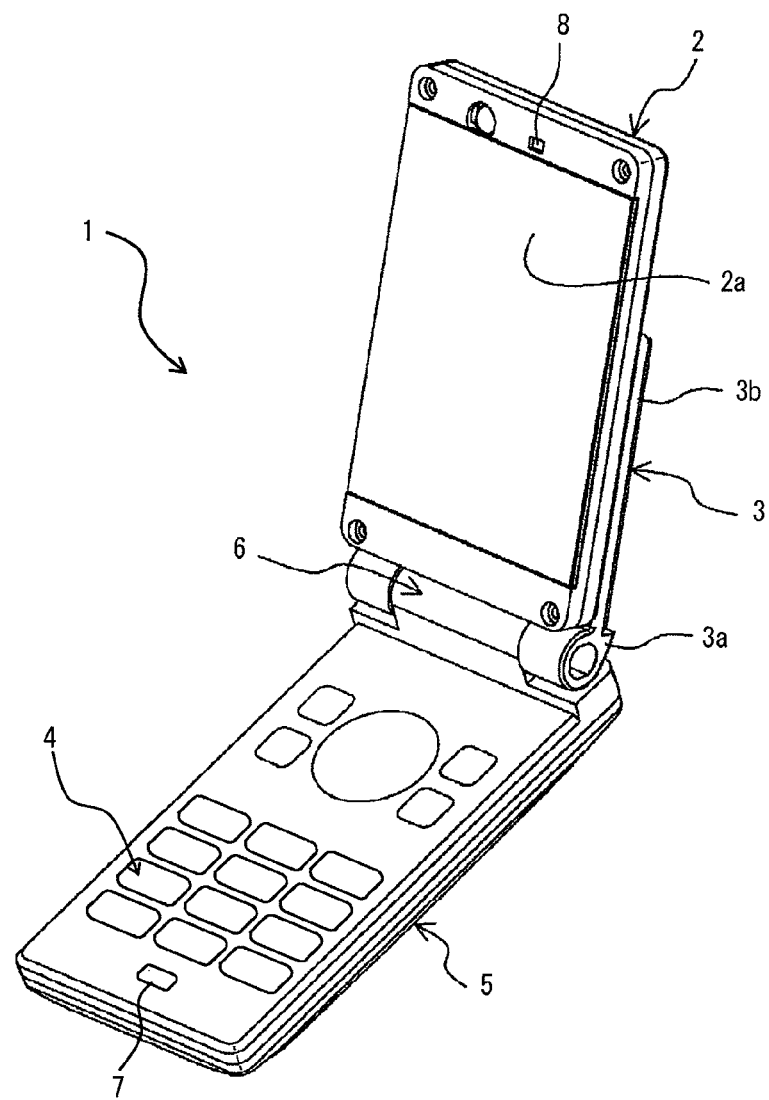
FIG. 2 is a perspective view showing the mobile phone of FIG. 1, in which the cases are expanded.

FIG. 1 is a perspective view showing an example of a mobile phone 1 according to a first embodiment of the present invention in a state that cases are closed. FIG. 2 is a perspective view of the mobile phone 1 of FIG. 1 in a state that the cases are expanded. The mobile phone 1 is a so-called folding-type mobile phone having a rectangular display case 2 connected to a rectangular operation case 5 via a hinge part 3, where the display case 2 and the operation case 5 can be folded by opposing case faces thereof from one other.

The display case 2 has a main display part 2a and a receiver 8 which are arranged in an internal face opposing the operation case 5 in a folded state. The main display part 2a is formed into a rectangular shape having a longitudinal direction which is arranged to be consistent with a longitudinal direction of the display case 2. The receiver 8 is arranged on an edge of the display case 2 on a side opposite to the hinge part 3.

The operation case 5 has a number of operation keys 4 and a transmitting microphone 7 which are arranged in an internal face opposing the display case 2 in a folded state. The transmitting microphone 7 is arranged on the edge of the operation case 5 on the side opposite to the hinge part 3.

Such the folding-type mobile phone 1 can be carried in a compactly folded state. And such the folding-type mobile phone 1 can depress and operate the operation keys 4 while looking at the display on the main display part 2*a*, if cases are developed. Moreover, the mobile phone 1 realizes satisfactory communication by setting the main display part 2*a* into a longitudinal state so as to put the internal face of the display case 2 on a user's ear while moving the transmitting microphone 7 close to a user's mouth and moving the receiver 8 close to the ear, as shown in FIG. 2.

That is, in order to transmit and receive voices in better quality, it is preferable that the transmitting microphone 7 is disposed close to a user's mouth and the receiver 8 is disposed close to the user's ear, and therefore the transmitting microphone 7 needs to be separated from the receiver 8 to some extent. In the mobile phone 1 according to the present embodiment, the transmitting microphone 7 is arranged on an edge of the operation case 5 on a side opposite to the hinge part 3, and the receiver 8 is arranged on an edge of the display case 2 on a side opposite to the hinge part 3, whereby a distance between transmitting microphone 7 and the receiver 8 can be ensured in a longitudinally extended state.

The hinge part 3 is structured so that a joint part 3*a* which is rotatably connected to the operation case 5 is integrally formed with a holding part 3*b* for holding the display case 2 opposite to an external face of the display case 2. The joint part 3*a* is made of two cylindrical bodies created to be separated from one another with a fixed interval and protrude in one edge of the holding part 3*b*. A cylindrical body 6 is created to extend in a widthwise direction in one edge of the operation case 5 in an internal face of the longitudinal direction, and the cylindrical body 6 is arranged between two of the joint parts 3*a* on the same axis line and rotatably mounted from one another, whereby the hinge part 3 is rotatably connected to the operation case 5.

The holding part 3*b* is formed into a rectangular plate shape and opposes about a half of the external face of the display case 2 on the hinge part 3 side when the main display part 2*a* should be in a longitudinal state. The holding part 3*b* rotatably holds the display case 2 within a face of horizontally disposing the main display part 2*a*, where the display case 2 can be rotated in a state that an inclined angle is held to the operation case 5. On an external face of the holding part 3*b* on a side opposite to the display case 2, there is arranged a sub-display part 11 to display contents mainly in a state of closing the cases.

Figure 3:
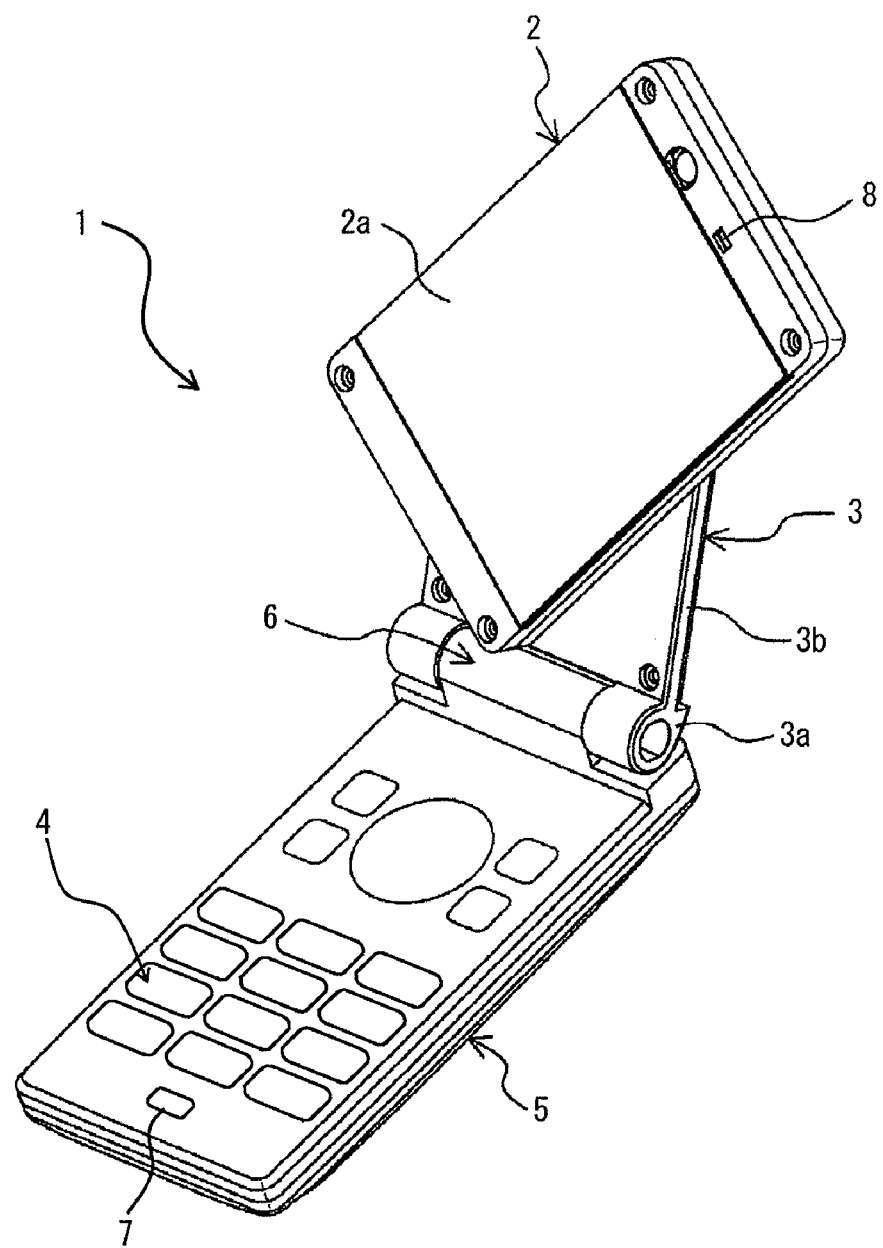
FIG. 3 is a perspective view showing a display case of the mobile phone of FIG. 2 is rotated clockwise at about 45 degrees from a state of FIG. 2 when it is seen from a front surface.
Figure 4:
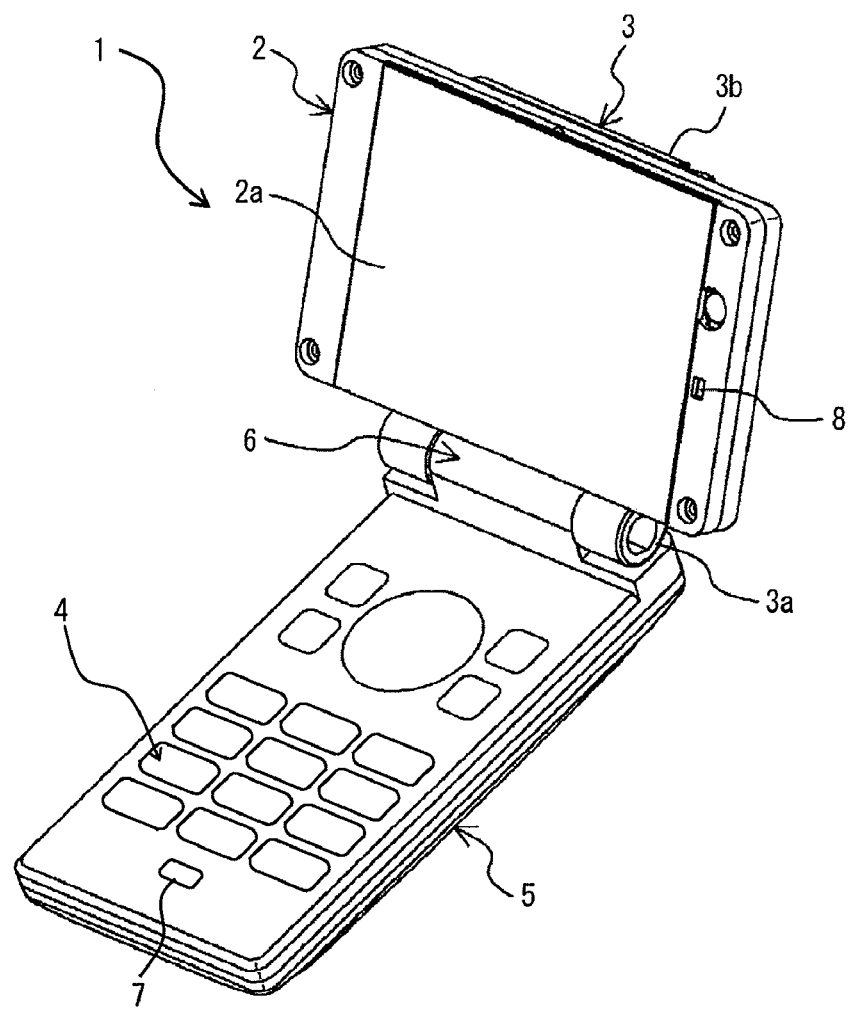
FIG. 4 is a perspective view showing the display case of the mobile phone of FIG. 2 is rotated clockwise at 90 degrees from the state of FIG. 2 when it is seen from a front surface.

FIG. 3 is a perspective view showing a state of rotating the display case 2 of the mobile phone 1 of FIG. 2, where clockwise rotation from the state of FIG. 2 at about 45 degrees is exhibited when it is seen from the front surface. FIG. 4 is a perspective view showing a state of rotating the display case 2 of the mobile phone 1 of FIG. 2, where clockwise rotation from the state of FIG. 2 at 90 degrees is exhibited when it is seen from the front surface. The user rotates the display case 2 within a face of horizontally disposing the main display part 2*a* while holding the operation case 5 within an angle range of 90 degrees, whereby the display case 2 can be rotated between the longitudinally extended state as shown in FIG. 2 and the laterally extended state as shown in FIG. 4.

The mobile phone 1 allows the user to view television broadcasts, in which satisfactory television images can be displayed on the main display part 2*a* disposed in the laterally extended state which matches an aspect ratio of the television image by rotating the display case 2 from the state of FIG. 2 through the state of FIG. 3 to reach the laterally extended state of the main display part 2*a* as shown in FIG. 4. The main display part 2*a* is formed into a rectangular shape with a ratio of 16:9 between a long side to a short side, and this ratio is consonant with an aspect ratio of the television images for use in typical the television broadcasts.

In rotating the display case 2 clockwise from the state of FIG. 2, energizing means provided in the holding part 3*b* of the hinge part 3 causes energizing force to act anticlockwise on the display case 2 until the state shown in FIG. 3 is exhibited. Accordingly, the display case 2 is maintained in the state of FIG. 2 due to energizing force acting anticlockwise on the display case 2 unless external force has effects.

In contrast, if the display case 2 is further rotated clockwise beyond the state of FIG. 3, energizing force acting on the display case 2 is switched to clockwise so as to lock the display case 2 in the state of FIG. 4. Therefore, the display case 2 is maintained in the state of FIG. 4 unless external force has effects.

According to the present embodiment, the display case 2 is rotated by using a rotational axis which moves along rotation of the display case 2 as a center instead of using a rotational axis fixed to a certain position as a center. Accordingly, even if the display case 2 of the longitudinally extended state whose one end of a longitudinal direction is disposed adjacent to the operation case 5 as shown in FIG. 2 is rotated at 90 degrees, one end of a widthwise direction of the display case 2 is disposed adjacent to the operation case 5 as shown in FIG. 4, so that a user is allowed to view the television broadcasts by displaying the television images on the main display part 2*a* which is compactly brought into the laterally extended state.

The user is also allowed to view the television broadcasts by rotating the display case 2 from the longitudinally extended state to the laterally extended state while maintaining the state of holding the operation case 5 without changing the way of holding the mobile phone 1. At this time, energizing force acting on the display case 2 is used to realize smooth switching of the display case 2 between the longitudinally extended state and the laterally extended state.

Figure 5:
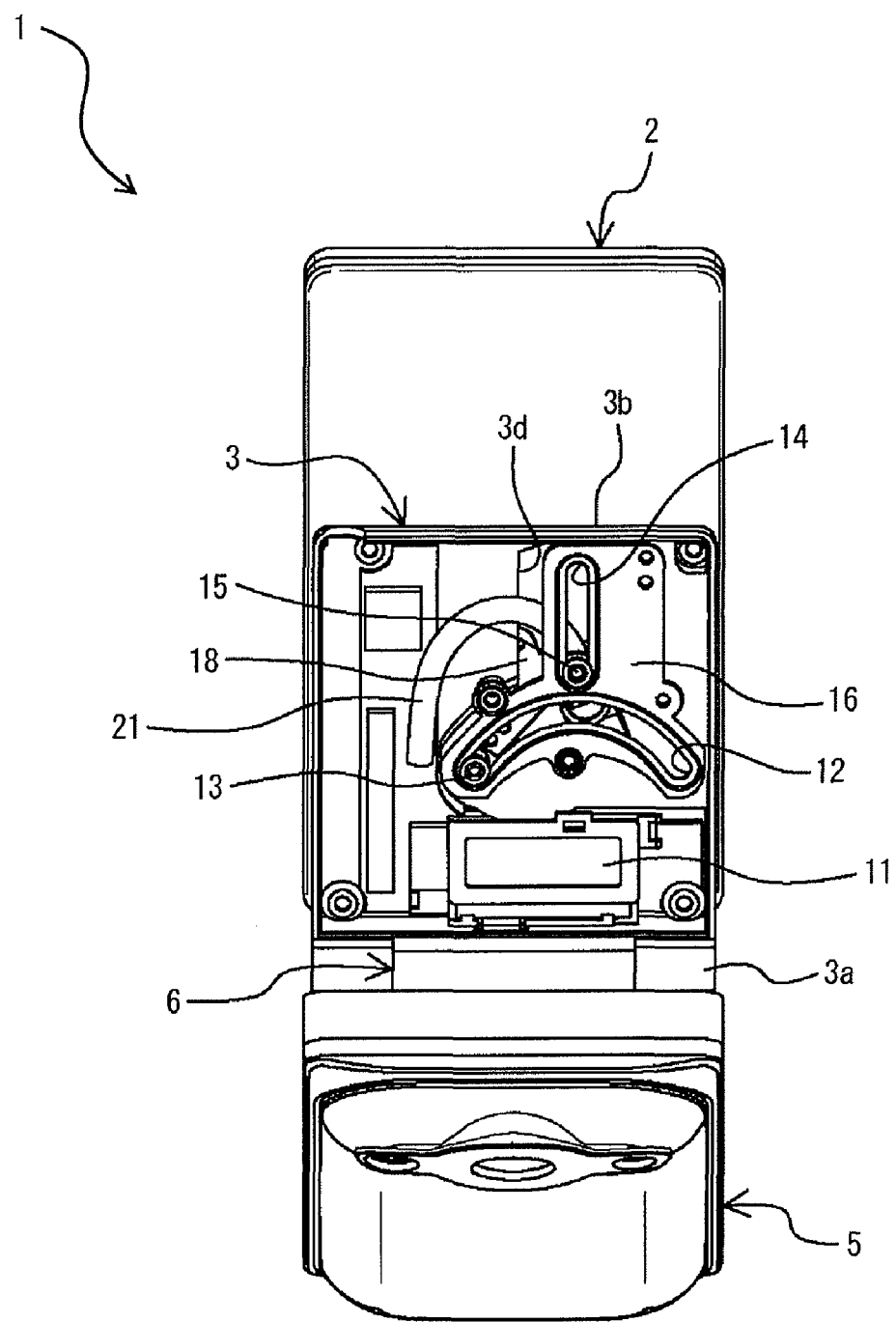
FIG. 5 is a rear surface view of the mobile phone in the state of FIG. 2, showing a perspective structure in a holding part.
Figure 6:
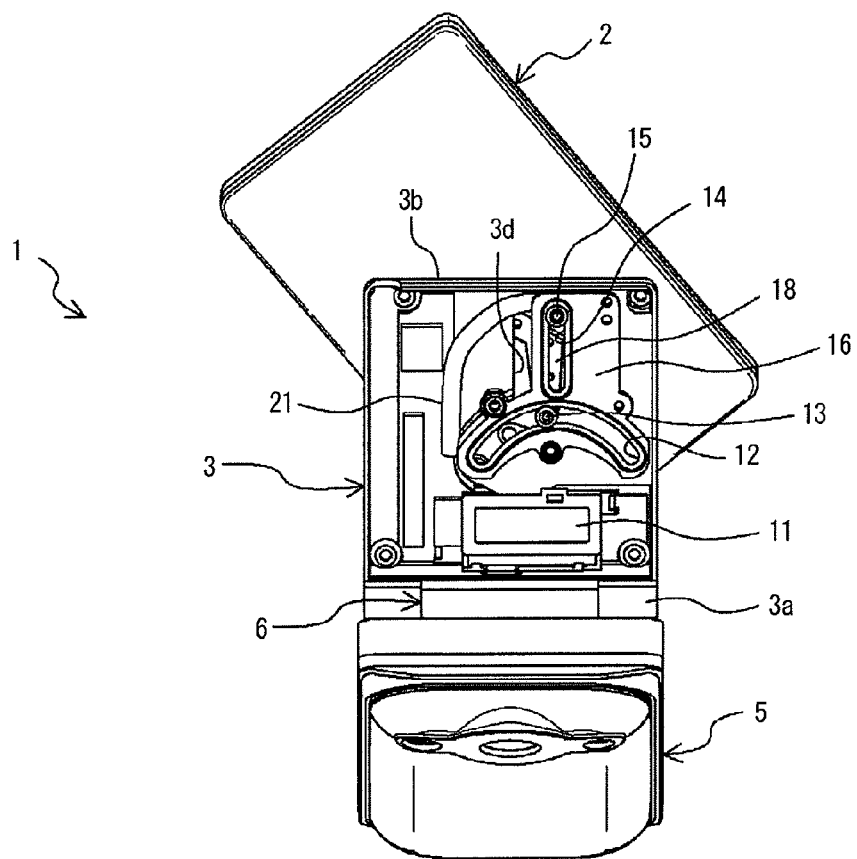
FIG. 6 is a rear surface view of the mobile phone in a state of FIG. 3, showing a perspective structure in the holding part.
Figure 7:
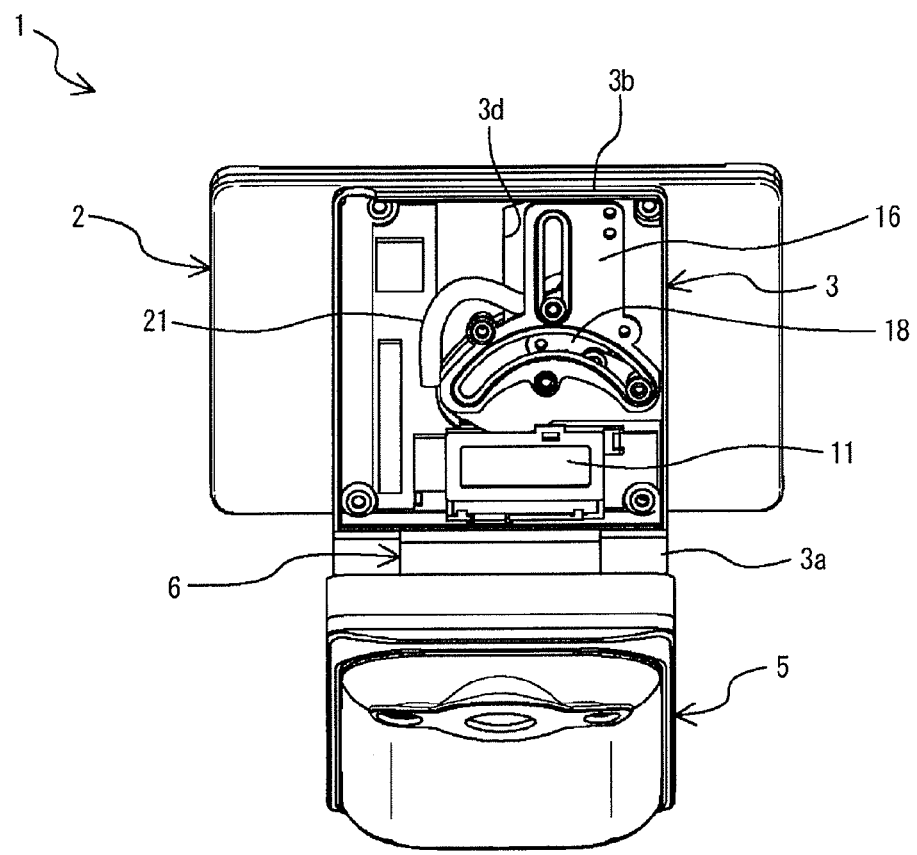
FIG. 7 is a rear surface view of the mobile phone in a state of FIG. 4, showing a perspective structure in the holding part.
Figure 8:
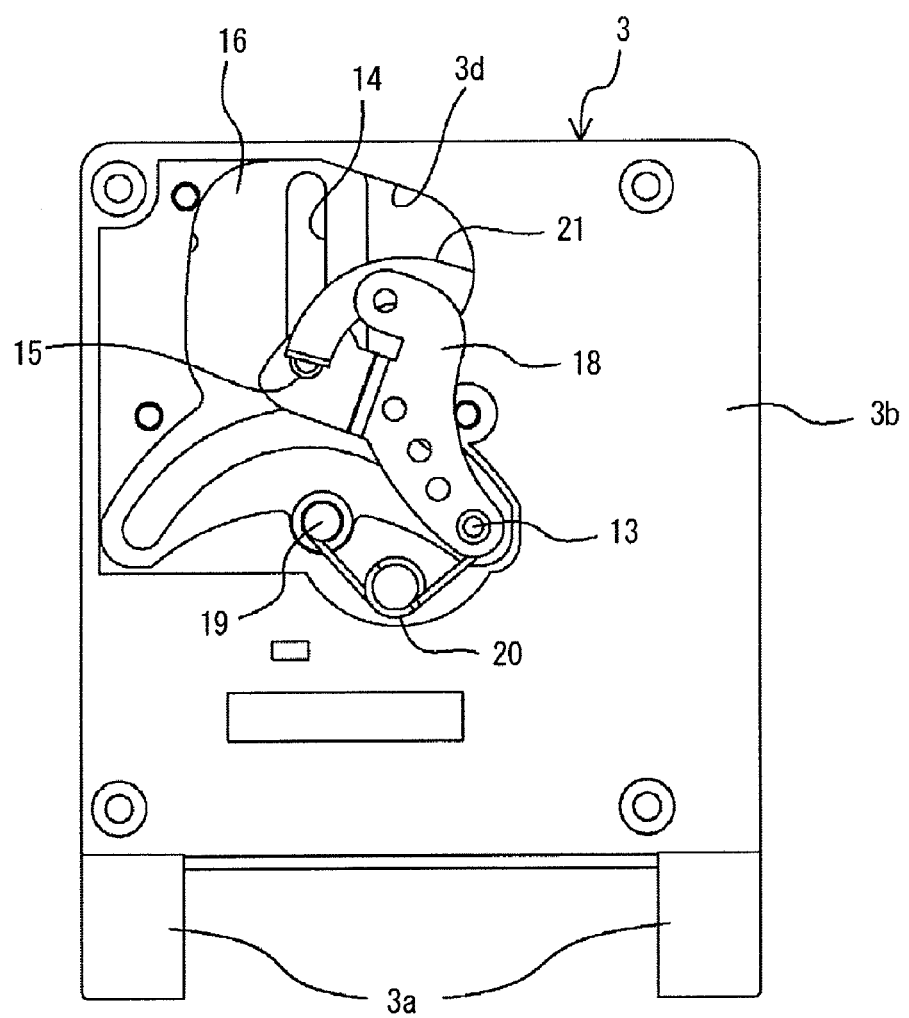
FIG. 8 is a front surface view of a hinge part in the state of FIG. 2.
Figure 9:
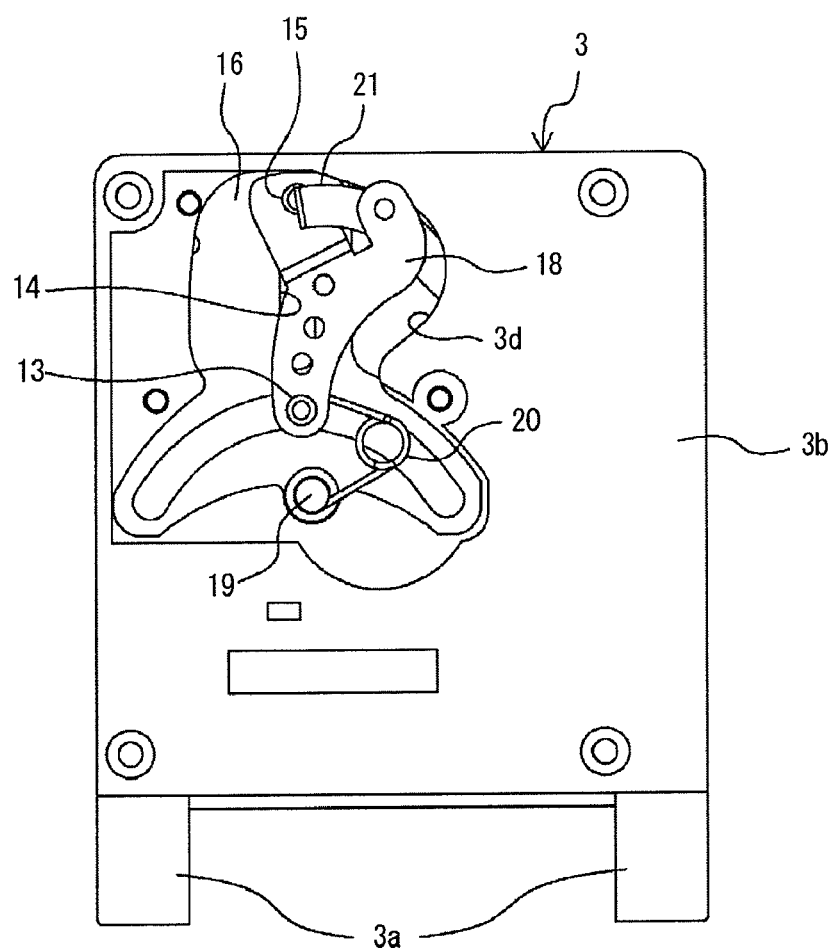
FIG. 9 is a front surface view of the hinge part in the state of FIG. 3.
Figure 10:
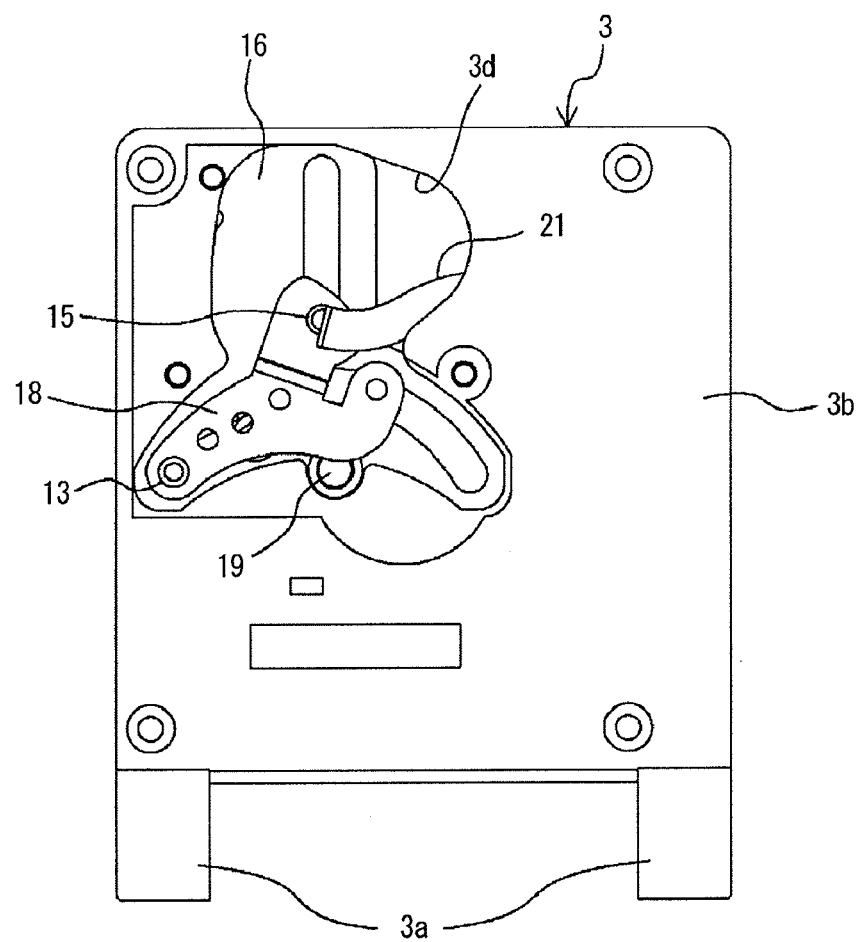
FIG. 10 is a front surface view of the hinge part in a state of FIG. 4.

FIGS. 5 to 7 are rear surface views of FIGS. 2 to 4 in the mobile phone 1, each showing a perspective structure in the holding part 3*b*. FIGS. 8 to 10 are front surface views of the hinge part 3 corresponding to FIGS. 2 to 4. FIGS. 5 and 8 correspond to the longitudinally extended state of FIG. 2, whereas FIGS. 6 and 9 correspond to the state of FIG. 3 in which the display case 2 is rotated at about 45 degrees, while FIGS. 7 and 10 correspond to the laterally extended state of FIG. 4.

A holding plate 16 of a rectangular shape is arranged in the holding part 3*b*, and the holding plate 16 rotatably holds the display case 2. The holding plate 16 includes an arc hole 12 extending along an arc in a lateral direction and a linear hole 14 extending linearly in a longitudinal direction. A top corner in the center of the arc hole 12 is disposed adjacent to one end of the linear hole 14, and the linear hole 14 extends in a normal line direction in the top corner.

The arc hole 12 and the linear hole 14 are rotatably engaged with a sliding axis 13 and a rotational axis 15 respectively which are formed on a rear surface side of the display case 2. The sliding axis 13 and the rotational axis 15 are integrally formed in an axis holding member 18 fixed to a rear surface of the display case 2, being arranged in positions displaced from one another with a fixed interval from the center of the display case 2. The axis holding member 18 is engaged with the holding plate 16 in the holding part 13 via an opening 3*d* created in front of the holding part 3*b*.

The axis holding member 18 is fixed to the holding plate 16 via a torsion coil spring 20 which is provided as an example of a spring being energizing means. The torsion coil spring 20 has one end engaged with the sliding axis 13 of the axis holding member 18, and the other end engaged with a mounting axis 19 created in the holding plate 16. The mounting axis 19 is rotatably arranged on a normal line with respect to the top corner of the arc hole 12. The display case 2 has a flexible substrate 21 which extends from the hinge part 3 side and whose end portion is mounted in the vicinity of the rotational axis 15, whereby the display case 2 and the operation case 5 are electrically connected via the flexible substrate 21.

In the longitudinally extended state as shown in FIGS. 5 and 8, the rotational axis 15 is connected to a lower edge of the linear hole 14, and the sliding axis 13 is connected to one end of the arc hole 12. In this state, the sliding axis 13 is urged to one end side of the arc hole 12 by the torsion coil spring 20, where the display case 2 is maintained in this state unless external force has effects.

If the display case 2 is rotated from this state with respect to the hinge part 3, the rotational axis 15 moves upward along the linear hole 14, and the sliding axis 13 moves to the other end along the arc hole 12. At this time, the torsion coil spring 20 is also rotated by using the mounting axis 19 as a center, and a distance between one end and the other end of the torsion coil spring 20 is made shorter so as to be proximal from one another. In a state where the display case 2 is rotated at about 45 degrees as shown in FIGS. 6 and 9, the rotational axis 15 is connected to an upper end of the linear hole 14, and the sliding axis 13 reaches the top corner of the arc hole 12.

One end and the other end of the torsion coil spring 20 are disposed most proximally in this state, and if the display case 2 is further rotated, left and right positions of the sliding axis 13 and the mounting axis 19 are reversed and one end of the torsion coil spring 20 is separated from the other end thereof again. Accordingly, rotation of the display case 2 beyond the rotational position as shown in FIGS. 6 and 9 is followed by further rotation of the display case 2 by energizing force of the torsion coil spring 20 so as to reach the laterally extended state as shown in FIGS. 7 and 10.

When the display case 2 falls in the laterally extended state, the rotational axis 15 is connected to a lower end of the linear hole 14, and the sliding axis 13 is connected to the other end of the arc hole 12. In this state, the sliding axis 13 is urged to the other end side of the arc hole 12 by the torsion coil spring 20, where the display case 20 is maintained in this state unless external force has effects.

Figure 11:
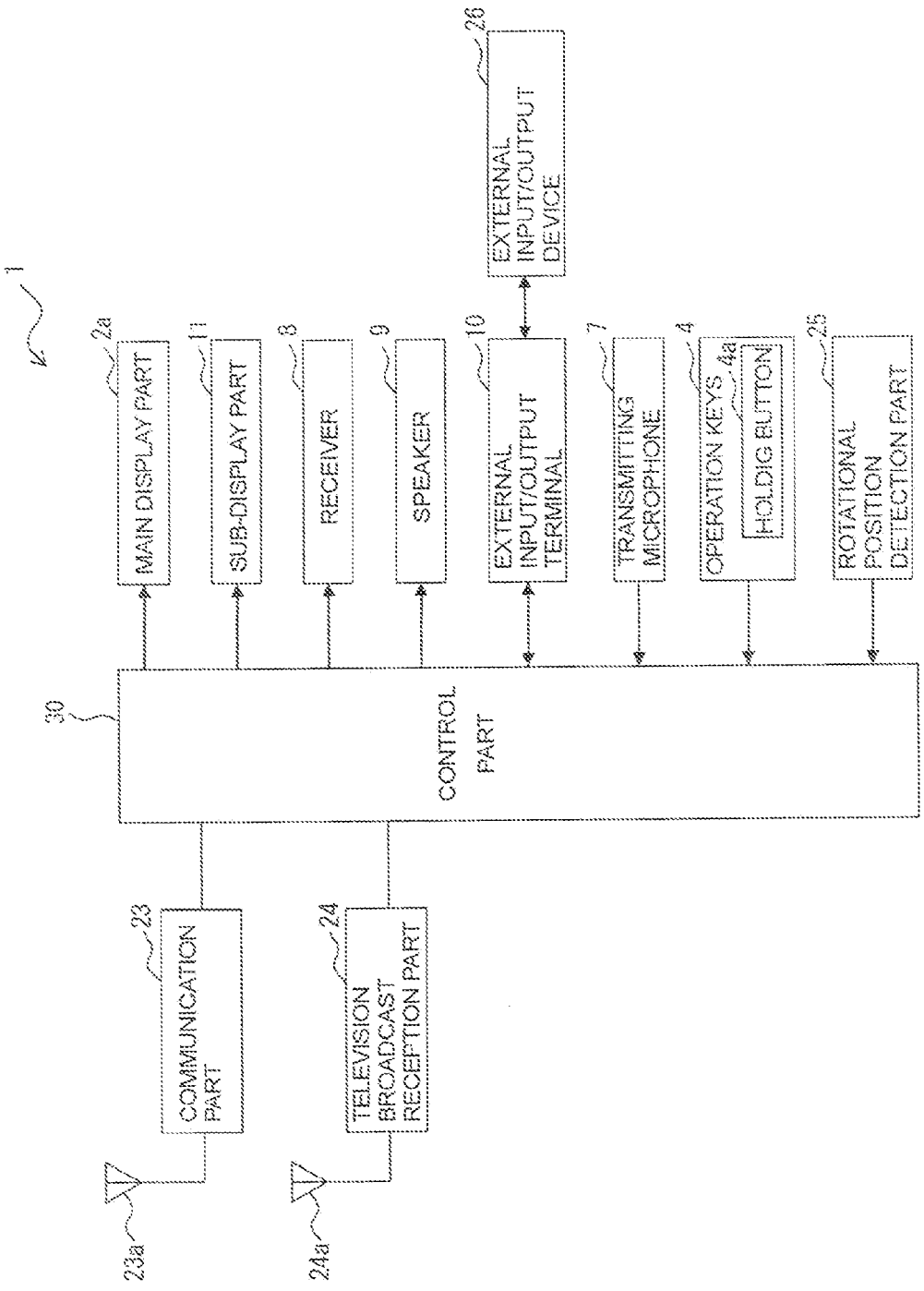
FIG. 11 is a block diagram showing an example of an electrical structure of the mobile phone.

FIG. 11 is a block diagram showing an example of an electrical structure of the mobile phone 1. The mobile phone 1 is provided with a speaker 9, an external input/output terminal 10, a communication part 23, a television broadcast reception part 24, and a rotational position detection part 25 in addition to the aforementioned main display part 2a, sub-display part 11, receiver 8, transmitting microphone 7, and operation keys 4, wherein these operations are controlled by a control part 30 made of a processor.

The speaker 9 is provided so that the user is allowed to listen to voice in a state of keeping the display case 2 away from the ear by outputting the voice which is amplified in comparison with the case of outputting the voice from the receiver 8. If the external input/output device 26 such as an earphone microphone is connected to the external output terminal 10, voice input/output is realized via the external input/output device 26. The receiver 8, the speaker 9 and the external input/output terminal 10 constitute voice output means.

The speaker 9 and the external input/output terminal 10 here are used in a state that the user keeps the internal face of the display case 2 away from the ear, as opposed to the receiver 8 which is used in a state that the user puts the internal face of the display case 2 on the ear. Accordingly, display of the television images or other images on the main display part 2a can be seen when the speaker 9 or the external input/output terminal 10 is used, but it cannot be seen when the receiver 8 is used.

If the user communicates with the other party phone by using the speaker 9, voice from the phone of the other party phone is amplified and outputted from the speaker 9 while input signals from the transmitting microphone 7 are amplified, whereby so-called hands-free communication can be made without holding the mobile phone 1. At this time, input signals from the transmitting microphone 7 are inputted to a cancellation circuit so as to prevent howling. Switching between normal communication made by the receiver 8 and hands-free communication is realized by operating the operation keys 4.

A connection terminal of the external input/output device 26 can be attached to or detached from the external input/output terminal 10, in which normal communication made by the receiver 8 and communication made by the external input/output device 26 can be switched on the basis of attachment/detachment of the connection terminal. That is, the normal communication can be switched to the communication made by the external input/output device 26 by mounting the connection terminal of the external input/output device 26 to the external input/output terminal 10, whereas returning to normal communication made by the receiver 8 can be realized by detaching the connection terminal of the external input/output device 26 from the external input/output terminal 10.

In the communication part 23, communication voices are transmitted/received by transmitting/receiving radio waves to/from a base station via a communication antenna 23a. When the communication state is established with the other party phone, the voice signal based on communication voice of the user is transmitted from the communication part 23, and a voice signal based on the communication voice from the other party phone is received in the communication part 23, whereby the communication voices can be transmitted/received in real time.

The television broadcast reception part 24 is provided to receive the television broadcast waves transmitted from television stations via a television broadcast reception antenna 24a. Television broadcast waves transmitted from the television stations include analog broadcast waves corresponding to analog broadcasts and digital broadcast waves corresponding to digital broadcasts. Digital broadcast waves received by the television broadcast reception part 24 are one-segment broadcast waves allocated to a fixed bandwidth of typical digital high-vision broadcast waves for use in mobile phones, including the television images, the television voice and additional character information such as caption and associated articles corresponding to the television images.

On the basis of the television broadcast waves received by the television broadcast reception part 24, television images are displayed on the main display part 2a while television audio corresponding to the television image is outputted from the speaker 9 or the external input/output terminal 10, whereby the user is allowed to view the television broadcasts. Character information included in the television broadcasts are extracted and displayed on the main display part 2a so as to display character information such as caption along the television image.

The rotational position detection part 25 is constituted by a mechanical or electrical switch, for example, and detects a rotational position of the display case 2. This rotational position detection part 25 is rotational operation detection means to detect a rotational operation of the display case 2 by the user.

In an established communication state, the operation keys 4 include a holding button 4a for providing a holding state by stopping an output of communication voice to the other party phone. When the user operates the holding button 4a in the established communication state, user's voice cannot be heard in the other party phone and holding tone such as music is heard in the other party phone on the basis of an output signal sent from the mobile phone 1 to the other party phone.

Figure 12:
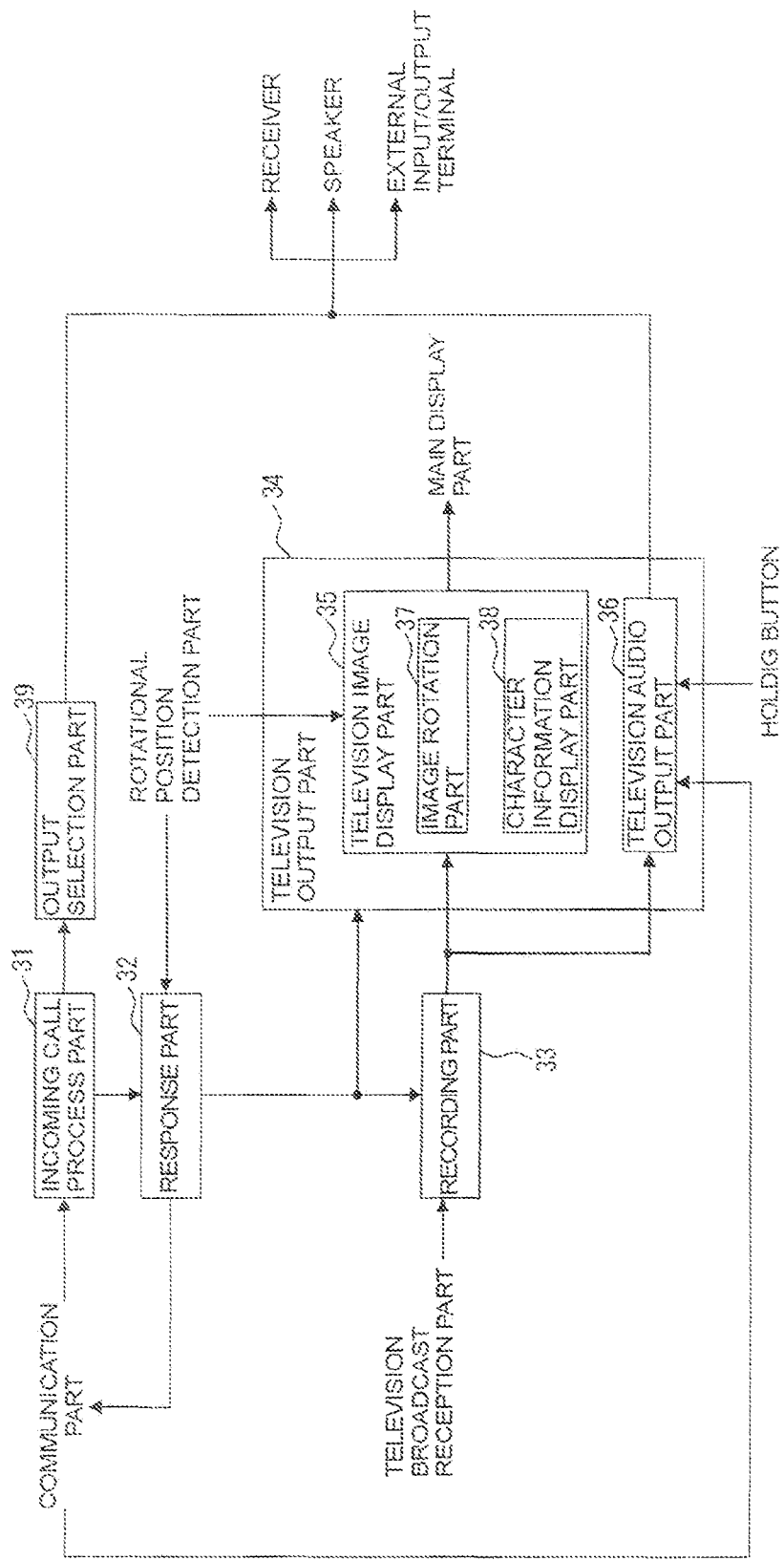
FIG. 12 is a block diagram to explain an operation carried out when signals are received in a communication part and a television broadcast reception part.

FIG. 12 is a block diagram to explain an operation when a signal is received in the communication part 23 and the television broadcast reception part 24. In the present embodiment, the control part 30 executes a program process so as to cause an incoming call process part 31, a response part 32, a recording part 33, a television output part 34 and an output selection part 39 to function.

When a call signal from the other party phone was received in the communication part 23, the incoming call process part 31 executes an incoming call process in order to allow the user to answer the call by an off-hook operation. During an incoming call process, ringtone is normally outputted from the speaker 9 to notify the user of calling from the other party phone. The incoming call process is continued until calling from the other party phone is discontinued or the user carries out the off-hook operation.

The off-hook operation here includes any kinds of operations made by the user to answer a call from the other party phone, and may be, for example, an operation by the operation keys 4 or an operation to rotate the display case 2 from the laterally extended state to the longitudinally extended state during the incoming call process.

If the user answers a call from the other party phone by carrying out the off-hook operation during an incoming call process, the communication part 23 transmits a response signal to the other party phone so as to establish a communication state, whereby the communication voices can be transmitted to or received from the other party phone. In the established communication state, the voice from the other party phone is outputted from any one selected among the receiver 8, the speaker 9 and the external input/output device 26 connected to the external input/output terminal 10. Selection among the receiver 8, the speaker 9 and the external input/output device 26 connected to the external input/output terminal 10 is made by the output selection part 39 so as to output the voice from the other party phone.

When the television broadcast wave is received in the television broadcast reception part 24, a signal indicating the television image, television audio and character information based on the television broadcast wave is inputted to the television output part 34 via the recording part 33. The recording part 33 records the television images, the television audio and the character information or the like in a memory (not shown) as needed on the basis of the television broadcast waves received in the television broadcast reception part 24, whereby the television broadcasts can be recorded.

The television output part 34 includes a television image display part 35 and a television audio output part 36. The television image display part 35 causes the main display part 2a to display the television images and the character information based on the television broadcast waves, including an image rotation part 37 for rotating images displayed on the main display part 2a and a character information display part 38 for extracting character information included in the television broadcast waves and causing the main display part 2a to display the character information. The television audio output part 36 outputs the television audio based on the television broadcast waves to the speaker 9 or the external input/output device 26 connected to the external input/output terminal 10.

The image rotation part 37 rotates a image to display on the main display part 2a on the basis of an input signal from the rotational position detection part 25 when the television broadcast wave is received in the television broadcast reception part 24. That is, if a state of the display case 2 is switched from the longitudinally extended state to the laterally extended state while the television broadcast wave is being received, the television images are displayed on the main display part 2a of the laterally extended state by setting a widthwise direction thereof as a vertical direction. If a state of the display case 2 is switched from the laterally extended state to the longitudinally extended state, the television images are displayed on the main display part 2a of the longitudinally extended state by setting a longitudinal direction thereof as a vertical direction. Therefore, the direction of the television image can be adjusted to the rotational position.

Signals from the response part 32 are inputted to the recording part 33 and the television output part 34. Signals are also inputted to the television audio output part 36 on the basis of reception of call signals received in the communication part 23 and the operation of the holding button 4a.

Figure 13:
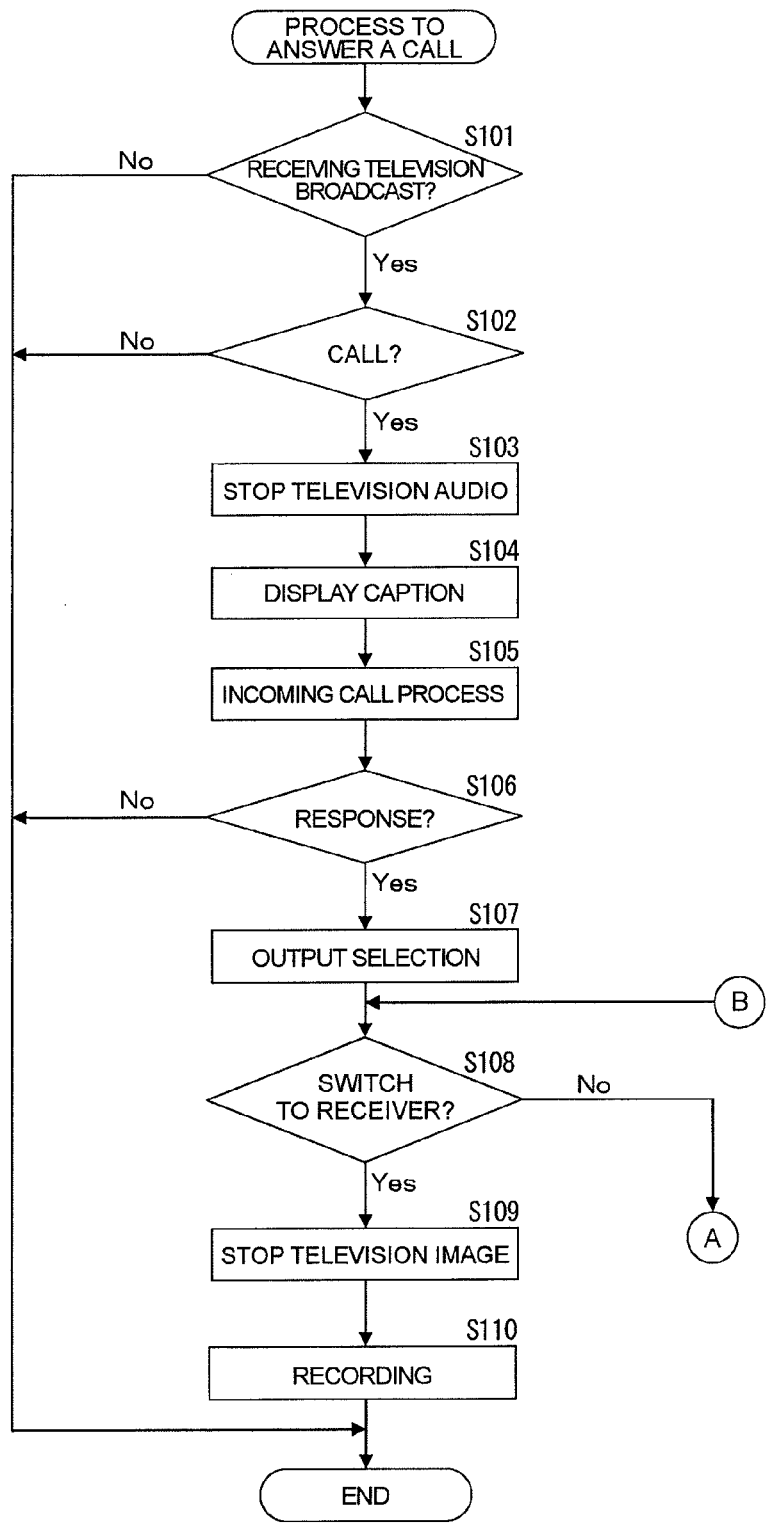
FIG. 13 is a flowchart showing an example of a process to answer a call when the call comes from the other party phone while receiving television broadcast waves.
Figure 14:
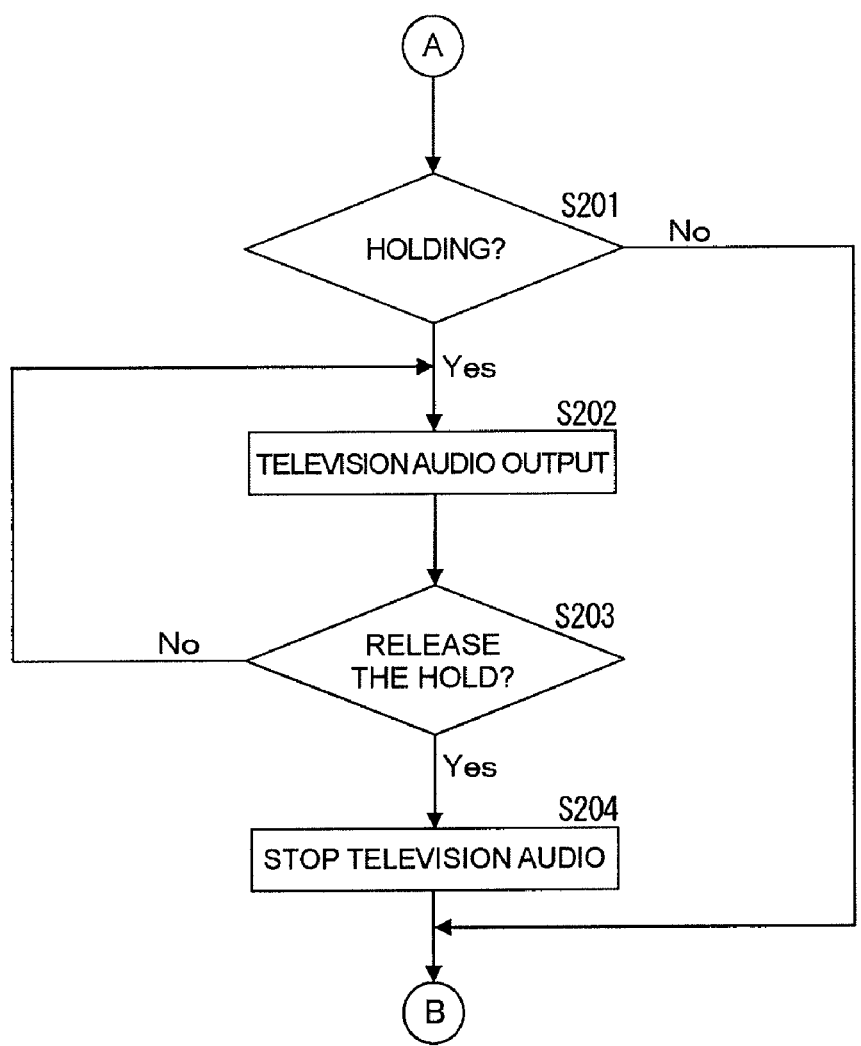
FIG. 14 is a flowchart showing an example of a process to answer a call when the call comes from the other party phone while receiving television broadcast waves, showing a process continued from FIG. 13.

FIGS. 13 and 14 are flowcharts showing an example of a process to answer a call from the other party phone while receiving the television broadcast waves. If the television broadcast wave is received in the television broadcast reception part 24 (Yes in step S101 of FIG. 13), and if a call signal is received from the other party phone (Yes in step S102), the television audio output part 36 stops outputting the television audio outputted at that time (step S103). Therefore, the television audio corresponding to the television image based on the television broadcast wave cannot be heard while the display of the television image is maintained on the main display part 2a.

At this time, the character information display part 38 extracts the character information included in the television broadcast wave and causes the main display part 2a to display caption corresponding to the television image (step S104). The incoming call process part 31 executes an incoming call process in a state of thus stopping output of the television audio (step S105), whereby it is made easier for the user to listen to ringtone outputted on the basis of the incoming call process.

Ringtone based on the incoming call process is outputted from audio output means used at that time. That is, the ringtone is outputted from the speaker 9 if the user views the television broadcasts by outputting television audio from the speaker 9, whereas the ringtone is outputted from the external input/output device 26 if the user views the television broadcast by outputting the television audio from the external input/output device 26 connected to the external input/output terminal 10. Moreover, if the ringtone is set so as not to be outputted at the time of the incoming call process, the user may be notified of calling from the other party phone by vibration made by a vibration device (not shown) provided in the mobile phone 1 and display on the main display part 2a or other methods.

Thereafter, if the user answers a call from the other party phone by an off-hook operation (Yes in step S106), a communication state is established to output voice from the other party phone after selecting the same audio output means for use in outputting television audio in the output selection part 39 (step S106).

Therefore, the voice from the other party phone is outputted from the speaker 9 if the user views the television broadcasts by outputting television audio from the speaker 9, whereas voice from the other party phone is outputted from the external input/output device 26 connected to the external input/output terminal 10 if the user views the television broadcasts by outputting television audio from the external input/output device 26. Accordingly, if the ringtone is outputted during the incoming call process, the voice is outputted from the same audio output means for use in outputting the ringtone.

If there is a call from the other party phone in the state of displaying the television images on the main display part 2a in the present embodiment, communication can be made with the other party phone by stopping output of the television audio corresponding to the television images while display of the television images are maintained on the main display part 2a. Since the captions corresponding to the television images can be displayed on the main display part 2a at this time, the user is allowed to continuously watch the television broadcasts based on the television images and captions while communicating with the other party phone.

Moreover, if there is a call from the other party phone in the state of displaying the television images on the main display part 2a, the voice from the other party phone can be outputted by using the audio output means outputting the television audio at that time. Accordingly, it is not necessary to switch the audio output means so as to communicate with the other party phone, and communication can be made by continuously using audio output means which has been used until then, where conveniences can be enhanced.

In an established communication state in which the speaker 9 or the external input/output device 26 connected to the external input/output terminal 10 is selected as stated above, the user is allowed to switch the voice output from the other party phone to the receiver 8 by carrying out a predetermined operation (step S108).

Such a switching operation can be made by, for example, operating the operation keys 4 in a state of outputting the voice from the speaker 9, or by the operation to remove the connection terminal of the external input/output device 26 from the external input/output terminal 10 in a state of outputting voice from the external input/output device 26. Voice output from the other party phone may also be switched to the receiver 8 on the basis of the operation to rotate the display case 2 from the laterally extended state to the longitudinally extended state.

If the voice output from the other party phone is switched to the receiver 8 (Yes in step S108), the television image display part 35 stops displaying the television images on the main display part 2a (step S109) while the recording part 33 records the television broadcasts by recording the television images and the television audio based on a subsequent television broadcast wave (step S110).

On the basis of the operation to output the voice from the receiver 8 when the user watches a television image displayed on the main display part 2a while outputting the voice from the other party phone by the speaker 9 or the external output/input device 26 as stated above, the display of the television image can be stopped on the main display part 2a. If the operation to output the voice from the receiver 8 was carried out, the user is required to put the internal face of the display case 2 on the ear in order to communicate, it becomes impossible to see the main display part 2a by the user, so that display of the television images is automatically stopped to realize efficient reduction of power consumption.

Moreover, the television broadcasts which were interrupted to view due to stopped display on the main display part 2a can be recorded so as to allow the user to watch the television broadcasts later, whereby conveniences can be improved.

Meanwhile, if the holding button 4a was operated in the established communication state to produce an input signal which is notified to the response part 32 for providing a holding state by stopping the voice output to the other party phone (No in step S108 of FIG. 13, Yes in step S201 of FIG. 14), the television audio output part 36 outputs the television audio corresponding to the television images displayed on the main display part 2a at that time (step S202). At this time, the television audio is outputted from the same audio output means being either the speaker 9 or the external input/output device 26 for use in outputting the voice from the other party phone.

While the television audio corresponding to the television images are thus outputted during the holding state, if the holding state is released by operating the holding button 4a again (Yes in step S203), the television audio output part 36 stops outputting the television audio again (step S204). Accordingly, when the user communicates with the other party phone by stopping output of the television audio while displaying the television images on the main display part 2a, and if the user desires to listen to the television audio by judging from content of the television images, the television audio can be temporarily heard by setting the holding state to output the television audio, where conveniences can be further enhanced.

Although explanation was made in the present embodiment for the structure in such that the television audio output part 36 completely stops outputting the television audio if there is a call from the other party phone while receiving the television broadcast waves, such a structure is not limited and a structure to reduce a volume of the television audio to an extent in which communication is not interrupted may be provided.

Explanation was also made in the present embodiment for the mobile phone 1 in which the display case 2 is rotatable within a face of horizontally disposing the main display part 2a, but the present invention is not limited to such a mobile phone 1 and it is applicable to a mobile phone structured to have the display case 2 which cannot be rotated within a face of horizontally disposing the main display part 2a.

Second Embodiment

Figure 15:
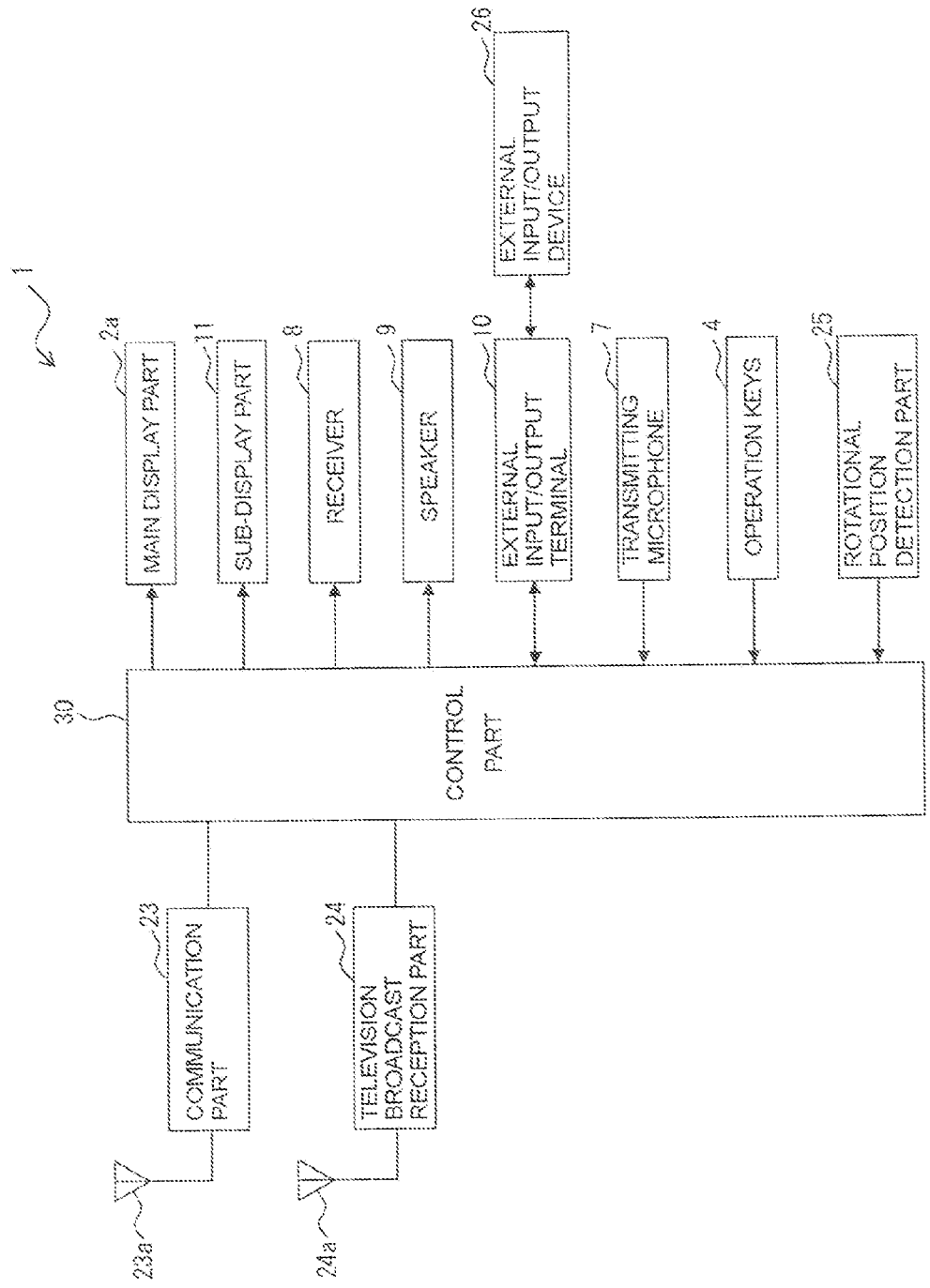
FIG. 15 is a block diagram showing an example of an electrical structure of a mobile phone according to a second embodiment of the present invention.

FIG. 15 is a block diagram showing an example of an electrical structure of the mobile phone 1 according to a second embodiment of the present invention. The mobile phone 1 is provided with the main display part 2a, the sub-display part 11, the receiver 8, the transmitting microphone 7, the operation keys 4, the speaker 9, the external input/output terminal 10, the communication part 23, the television broadcast reception part 24, and the rotational position detection part 25 in the same manner with the first embodiment, where these operations are controlled by the control part 30 made of a processor. The mobile phone 1 also has a structure similar to that of the first embodiment as shown in FIGS. 1 to 10. Explanation of the structure similar to that of the first embodiment will be omitted by providing like reference numbers in the drawings.

Figure 16:
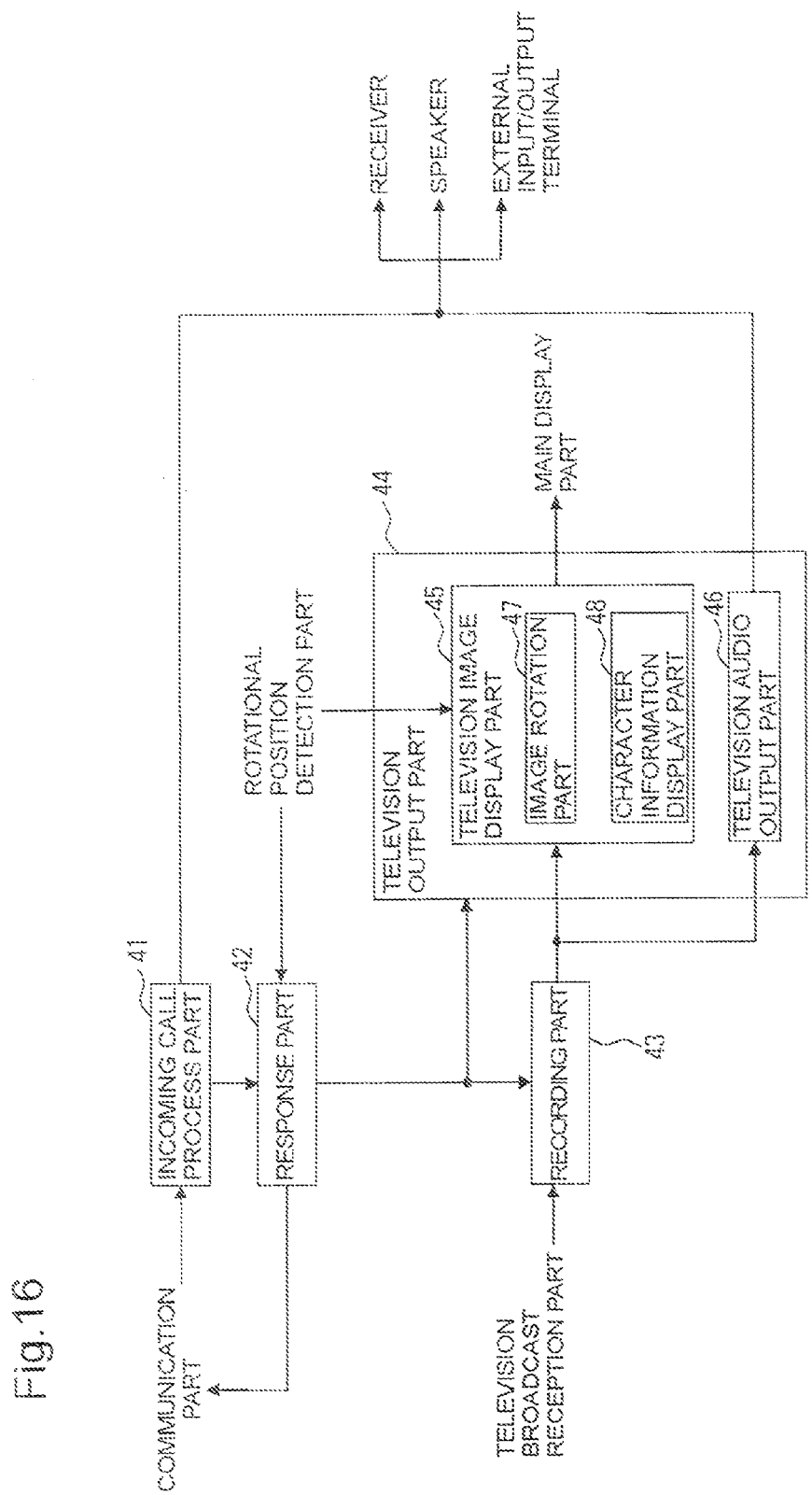
FIG. 16 is a block diagram to explain an operation carried out when signals are received in the communication part and the television broadcast reception part.

FIG. 16 is a block diagram to explain an operation when a signal is received in the communication part 23 and the television broadcast reception part 24. In the present embodiment, the control part 30 executes a program process so as to cause an incoming call process part 41, a response part 42, a recording part 43 and a television output part 44 to function.

If a call signal from the other party phone is received in the communication part 23, an incoming call process made by the incoming call process part 41 allows the user to answer the call by an off-hook operation. During the incoming call process, ringtone to notify the user of calling from the other party phone is normally outputted from the speaker 9. The incoming call process is continued until a call from the other party phone is stopped or the user carries out an off-hook operation. The off-hook operation here includes any kinds of operations made by the user to answer a call from the other party phone.

If the user answers a call from the other party phone by carrying out an off-hook operation during the incoming call process, a communication state is established by transmitting a response signal from the communication part 23 to the other party phone, whereby communication voices can be transmitted to or received from the other party phone. In the established communication state, the voice from the other party phone is outputted from any one selected among the receiver 8, the speaker 9 and the external input/output device 26 connected to the external input/output terminal 10.

If the television broadcast waves are received in the television broadcast reception part 24, signals indicating television images, television audio and character information based on the television broadcast waves are inputted to the television output part 44 via the recording part 43. The recording part 43 records the television images, the television audio and the character information or the like in a memory (not shown) as needed on the basis of the television broadcast waves received in the television broadcast reception part 24, whereby the television broadcasts can be recorded.

The television output part 44 includes a television image display part 45 and a television audio output part 46. The television image display part 45 causes the main display part 2*a* to the display television images and the character information based on the television broadcast waves, including an image rotation part 47 for rotating images displayed on the main display part 2*a* and a character information display part 48 for extracting the character information included in the television broadcast waves so as to display on the main display part 2*a*. The television audio output part 46 outputs the television audio based on the television broadcast waves to the speaker 9 or the external input/output device 26 connected to the external input/output terminal 10. Signals from the response part 42 are inputted to the recording part 43 and the television output part 44.

Figure 17:
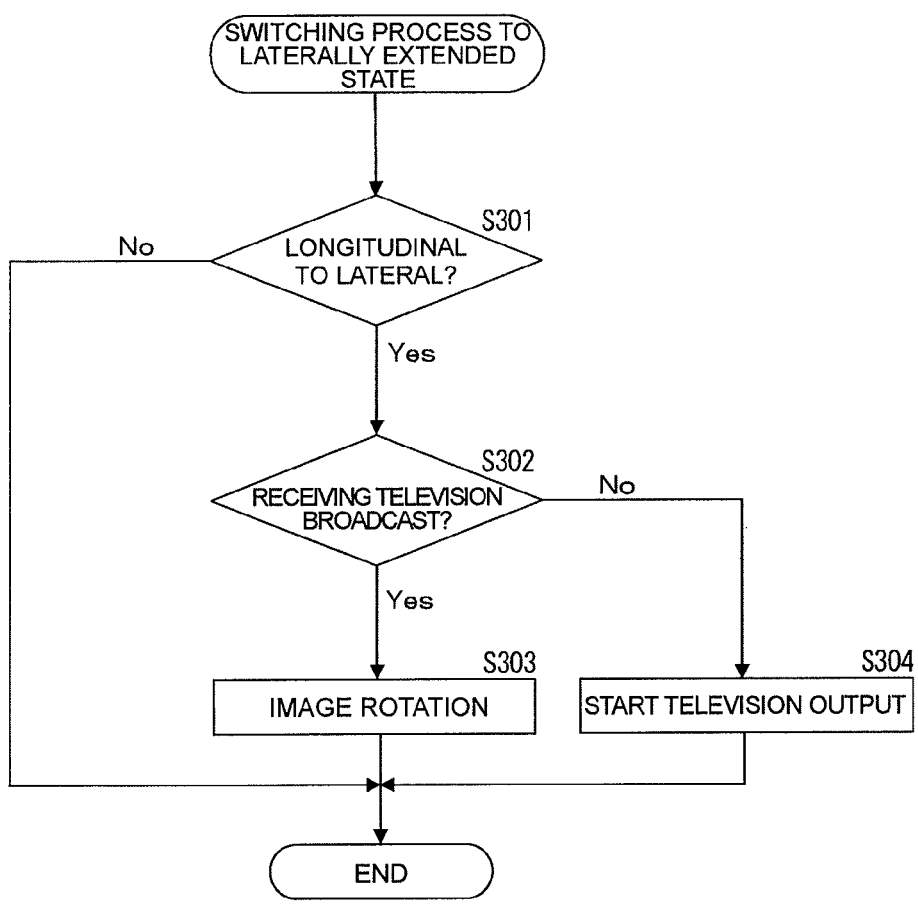
FIG. 17 is a flowchart showing an example of the laterally extended state switching process which is carried out when the display case is switched from the longitudinally extended state to the laterally extended state.

FIG. 17 is a flowchart showing an example of a laterally extended state switching process which is carried out when the display case 2 is switched from a longitudinally extended state to the laterally extended state. If the display case 2 is rotated and the rotational position detection part 25 detects switching from the longitudinally extended state to the laterally extended state (Yes in step S301), and if the television broadcast waves are received in the television broadcast reception part 24 at that time (Yes in step S302), display of the television images based on the television broadcast waves are rotated at 90 degrees by the image rotation part 47 (step S303). Therefore, the television images are displayed by setting a widthwise direction of the main display part 2*a* disposed in the laterally extended state as a vertical direction, whereby the direction of the television images can be adjusted to a rotational position.

In contrast, if the television broadcast waves are not received in the television broadcast reception part 24 when the display case 2 is switched from the longitudinally extended state to the laterally extended state (No in step S302), reception of the television broadcast waves are started to output the television images and the television audio based on the television broadcast waves from the television output part 44 (step S304). Therefore, the television images can be automatically displayed on the main display part 2*a* by simply rotating the display case 2 from the longitudinally extended state to the laterally extended state. Accordingly, an operation to rotate the display case 2 and an operation to start outputting the television image and the television audio are not both required, so that troublesome operations can be reduced.

Figure 18:
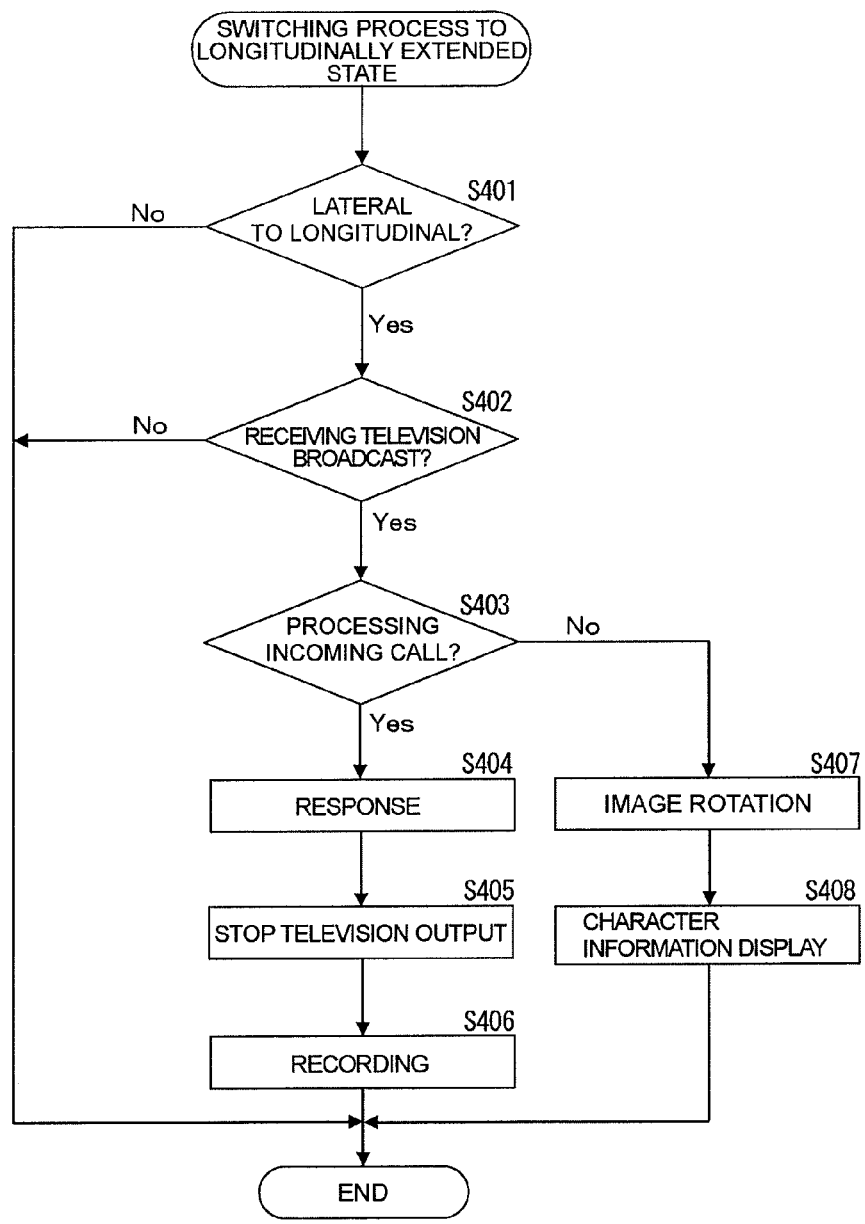
FIG. 18 is a flowchart showing an example of the longitudinally extended state switching process which is carried out when the display case is switched from the laterally extended state to the longitudinally extended state.

FIG. 18 is a flowchart showing an example of the longitudinally extended state switching process which is carried out when the display case 2 is switched from the laterally extended state to the longitudinally extended state. If the rotational position detection part 25 detects switching from the laterally extended state to the longitudinally extended state when the display case 2 is rotated (Yes in step S401), and if the television broadcast reception part 24 receives the television broadcast waves (Yes in step S402), and if the incoming call process part 41 executes an incoming call process (Yes in step S403), the response part 42 answers the call to establish a communication state (step S404). At this time, an operation to switch the display case 2 from the laterally extended state to the longitudinally extended state acts as an off-hook operation made by the user.

Thereafter, on the basis of an input signal from the response part 42, the television output part 44 stops outputting the television images and the television audio based on the television broadcast waves (step S405), and the recording part 43 records the television broadcasts by recording the television images and the television audio based on the television broadcast waves received thereafter in a memory (step S406).

As stated above, if an incoming call process is carried out while the display case 2 is disposed in the laterally extended state to display the television images on the main display part 2*a*, the user is allowed to answer a call by simply rotating the display case 2 from the laterally extended state to the longitudinally extended state. Accordingly, if there is a call from the other party phone while viewing the television broadcasts, the user is allowed to answer the call by simply rotating the display case 2, where an operation to rotate the display case 2 and an operation to answer the call are not both required, so that troublesome operations can be reduced.

Moreover, an output of the television images and the television audio can be stopped on the basis of an operation to rotate the display case 2 to answer a call from the other party phone. If the user answers a call by rotating the display case 2 from the laterally extended state to the longitudinally extended state, the user is required to put the internal face of the display case 2 on the ear in order to communicate, it becomes impossible to see the main display part 2*a*, by the user, where an output of the television images and the television audio are automatically discontinued to realize efficient reduction of power consumption.

It is also made possible to record the television broadcasts which were interrupted to view due to stopped output of the television images and the television audio so as to allow the user to watch the television broadcasts later. Accordingly, even if there is a call from the other party phone while viewing the television broadcasts, the user can answer the call without hesitation because of a relief knowing that subsequent television images are automatically recorded. Therefore, conveniences can be improved in receiving a call from the other party phone while viewing the television broadcasts.

Meanwhile, if the television broadcast reception part 24 receives the television broadcast waves when the display case 2 is switched from the laterally extended state to the longitudinally extended state, and if the incoming call process part 41 does not carry out the incoming call process (No in step S403), display of the television images based on the television broadcast waves are rotated at 90 degrees by the image rotation part 47 (step S407). Therefore, the television images are displayed by setting a longitudinal direction of the main display part 2a disposed in the longitudinally extended state as a vertical direction, where the direction of the television images can be adjusted to a rotational position.

At this time, since the main display part 2a should be in the longitudinally extended state as opposed to the laterally extended aspect ratio of 16:9 in the television images based on the television broadcast waves, there is an open space generated on the display screen of the main display part 2a if a lateral width of a displayed television image is adjusted to fit in the main display part 2a. Character information such as caption corresponding to the television image is displayed in this open space by the character information display part 48 (step S408). Accordingly, if the user desires to display character information, character information can be displayed by simply rotating the display case 2 to reach the longitudinally extended state, so that conveniences can be further enhanced.

Explanation was made in the present embodiment for the structure in such that the display case 2 is rotated by using the rotational axis which vertically moves along rotation of the display case 2 as a center, instead of using a rotational axis fixed to a certain position as a center, but such a structure is not limited and if the present invention is structured to have the display case 2 rotatable between the longitudinally extended state and the laterally extended state within a face of horizontally disposing the main display part 2a, it is applicable to a mobile phone having the display case 2 which is rotated by using a fixed rotational axis as a center.

Third Embodiment

Figure 19:
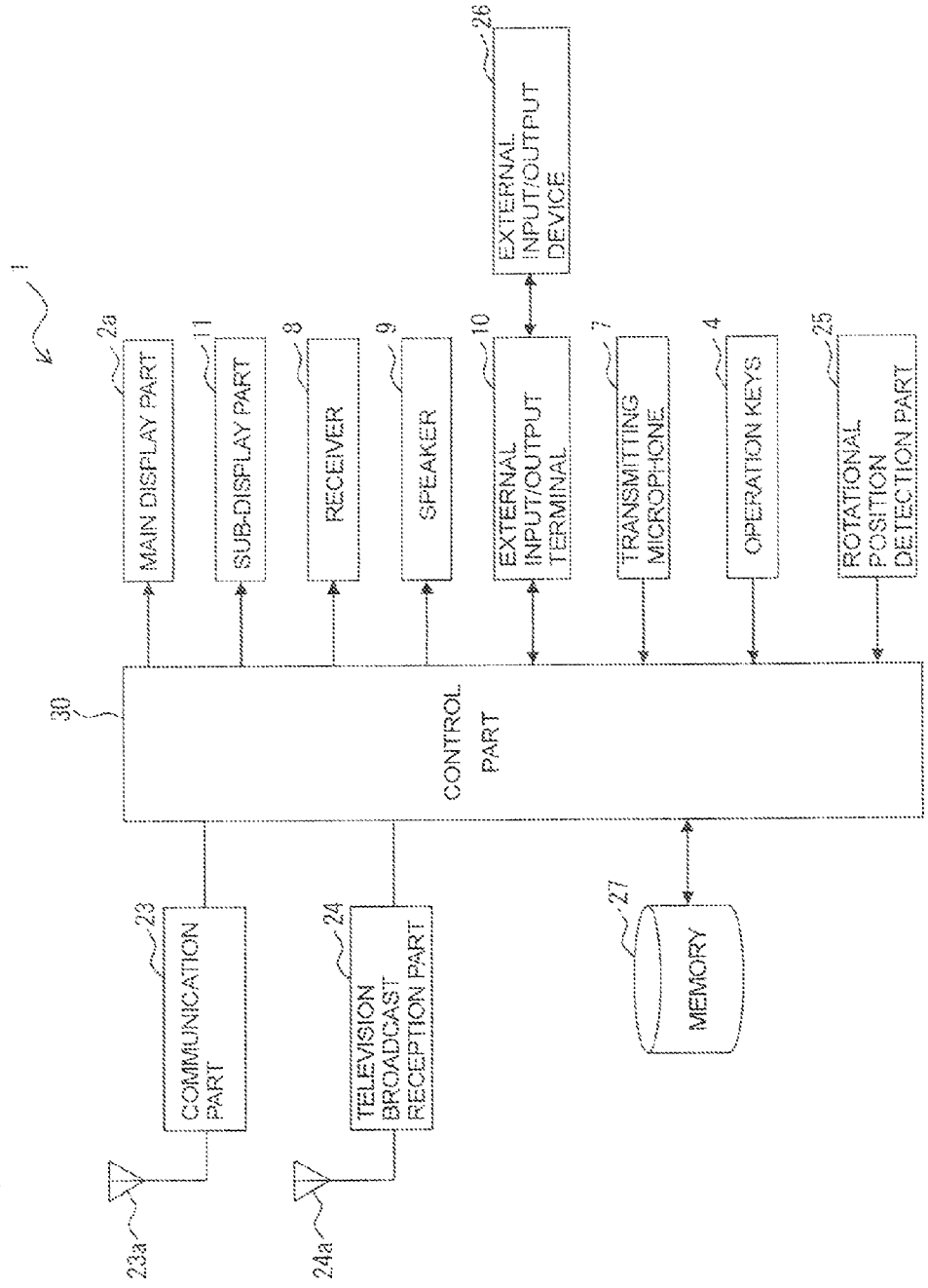
FIG. 19 is a block diagram showing an example of an electrical structure of a mobile phone according to a third embodiment of the present invention.

FIG. 19 is a block diagram showing an example of an electrical structure of the mobile phone 1 according to a third embodiment of the present invention. This mobile phone 1 is provided with the main display part 2a, the sub-display part 11, the receiver 8, the transmitting microphone 7, the operation keys 4, the speaker 9, the external input/output terminal 10, the communication part 23, the television broadcast reception part 24, and the rotational position detection part 25 in the same manner with the first embodiment, in addition to a memory 27, where these operation are controlled by the control part 30 made of a processor. The mobile phone 1 also has a structure similar to that of the first embodiment as shown in FIGS. 1 to 10. Explanation of the structure similar to that of the first embodiment will be omitted by providing like reference numbers in the drawings.

The communication part 23 transmits/receives not only communication voices but also electronic mails by transmitting/receiving electric waves to/from a base station via the communication antenna 23a. When an electronic mail is transmitted/received, the communication part 23 transmits/receives information such as character information indicating a subject of an electronic mail and a mail address of a transmitting source in addition to character information being contents of text of the electronic mail. That is, when an electronic mail is transmitted, character information, which includes text and a subject of an electronic mail created by the user operating the operation keys 4 of the mobile phone 1, and mail information such as a mail address on the user side are transmitted to a phone or a personal computer of a communication party (communication terminal of a communication party to/from which these electronic mails can be transmitted/received is referred to as an "opposite communication terminal" hereinafter). In contrast, when an electronic mail is received, character information including text and a subject of an electronic mail created in an opposite communication terminal and mail information such as a mail address of the opposite communication terminal are received.

Figure 20:
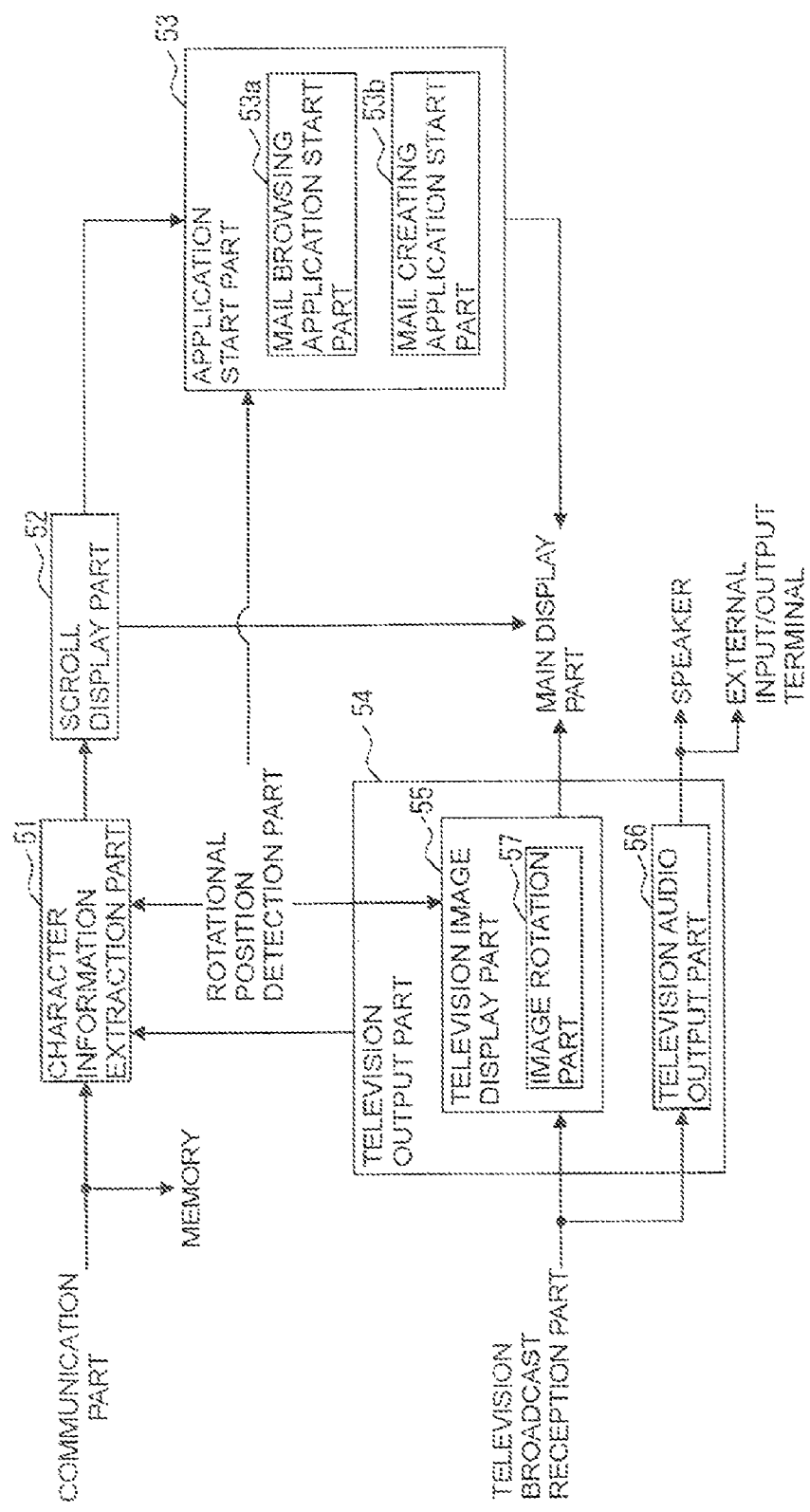
FIG. 20 is a block diagram to explain an operation carried out when signals are received in the communication part and the television broadcast reception part.

FIG. 20 is a block diagram to explain an operation when signals are received in the communication part 23 and the television broadcast reception part 24. In the present embodiment, the control part 30 executes a program process so as to cause a character information extraction part 51, a scroll display part 52, an application start part 53 and a television output part 54 to function.

When the television broadcast reception part 24 receives the television broadcast waves, signals indicating the television images, the television audio and the character information or the like based on the television waves are inputted to the television output part 54. The television output part 54 includes a television image display part 55 and a television audio output part 56.

The television image display part 55 causes the main display part 2a to display the television images and the character information based on the television broadcast waves, including an image rotation part 57 for rotating images displayed on the main display part 2a. The television audio output part 56 outputs the television audio based on television broadcast waves to the speaker 9 or the external input/output device 26 connected to the external input/output terminal 10.

The image rotation part 57 rotates images displayed on the main display part 2a on the basis of input signals from the rotational position detection part 25 when the television broadcast waves are received in the television broadcast reception part 24. That is, during reception of the television broadcast waves, the television images are displayed by setting a widthwise direction of the main display part 2a disposed in a laterally extended state as a vertical direction when the display case 2 is switched from a longitudinally extended state to a laterally extended state, whereas the television images are displayed by setting a longitudinal direction of the main display part 2a disposed in the longitudinally extended state as a vertical direction when the display case 2 is switched from the laterally extended state to the longitudinally extended state, whereby a direction of a television image can be adjusted to a rotational position.

If the communication part 23 receives an electronic mail from an opposite communication terminal, the memory 27 stores mail information such as text and a subject of the electronic mail and a mail address of the opposite communication terminal. At this time, if the main display part 2a should be in the laterally extended state, and if the television output part 54 outputs the television images and the television audio, the character information extraction part 51 extracts the character information including text of an electronic mail from the mail information.

Extracted character information is subjected to the scroll display on the main display part 2a by the scroll display part 52. The scroll display here refers to a display embodiment in which character information is displayed so as to move within a fixed area of the main display part 2a as time elapses, meaning so-called marquee display. That is, the character information including text of an electronic mail is displayed on the main display part 2a in sequential order from the head of the sentence and moved to a fixed direction on the main display part 2a, followed by being deleted from the main display part 2a in sequential order from the head of the sentence.

The application start part 53 receives an electronic mail in viewing the television broadcasts on the main display part 2a disposed in the laterally extended state, and if the character information including text of the electronic mail is subjected to the scroll display on the main display part 2a, an application is started at timing corresponding to an operation made by the user after the scroll display starts. In the present embodiment, said operation made by the user is an operation to rotate the display case 3 from the laterally extended state to the longitudinally extended state, in which a detected signal is inputted from the rotational position detection part 25 to the application start part 53.

The application start part 53 consists of a mail browsing application start part 53a for starting a mail browsing application and a mail creating application start part 53b for starting a mail creating application. The mail browsing application is an application for browsing the character information including text of received electronic mails. The mail creating application is also an application for creating reply electronic mails to received electronic mails.

Figure 21:
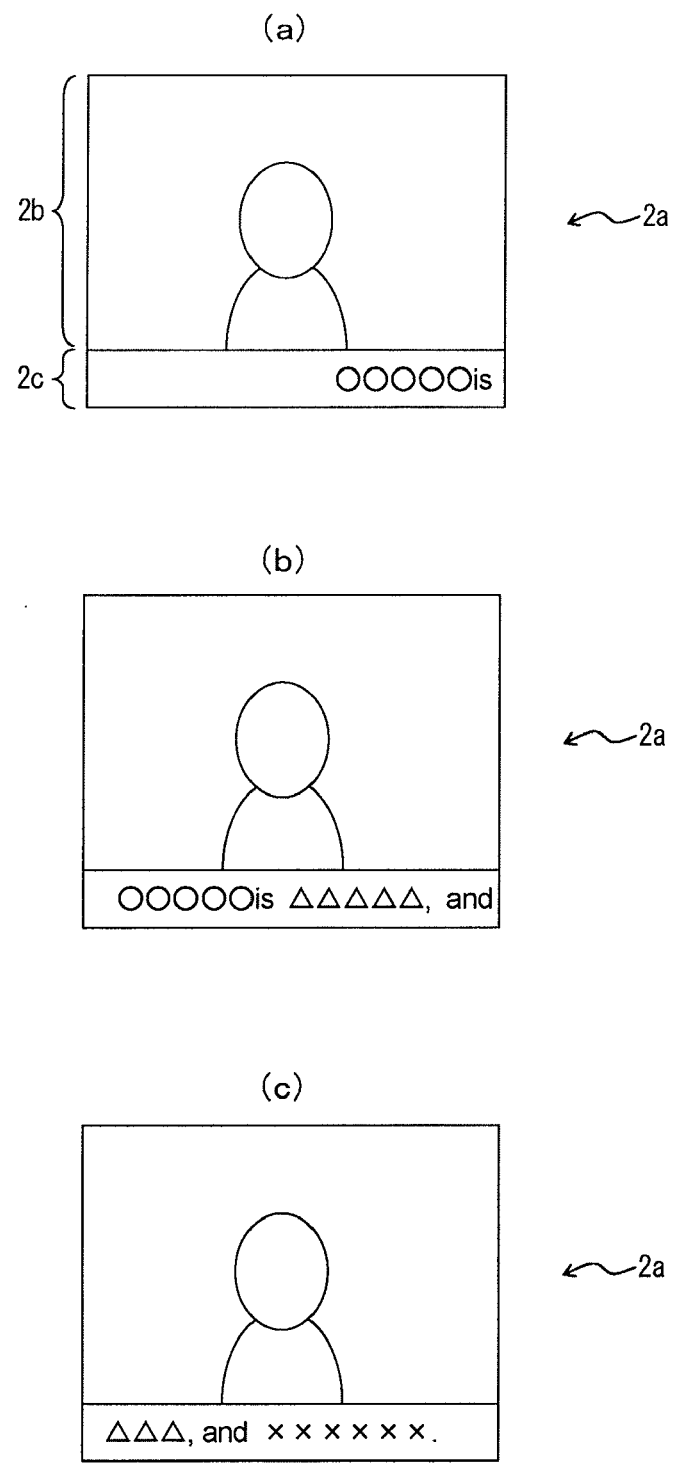
FIG. 21 shows an example of an embodiment in which character information including text of a received electronic mail is subjected to the scroll display on a main display by a scroll display of FIG. 20.

FIG. 21 shows an example of an embodiment in which character information including text of a received electronic mail is subjected to the scroll display on the main display part 2a by the scroll display part 52 of FIG. 20. When an electronic mail is received while displaying the television images on the main display part 2a disposed in the laterally extended state, the main display part 2a is divided into a television image display area 2b and a scroll display area 2c. The television images which have been displayed on the main display part 2a until then is continuously displayed in the television image display area 2b, and the character information including text of the received electronic mail is subjected to the scroll display in the scroll display area 2c.

The scroll display area 2c is arranged along a long side of the main display part 2a, i.e. along an upper side or a lower side of the main display part 2a disposed in the laterally extended state. In the example of FIG. 21, the scroll display area 2c is arranged along a lower side of the main display part 2a of the laterally extended state, and configured as a display area for a single line extending linearly in a vertical direction.

The character information including text of the received electronic mail is subjected to the scroll display in the scroll display area 2c at a speed to allow the user to read the information from a right edge to a left edge of the scroll display area 2c. More specifically, the character information of the head of the sentence is initially displayed on a right edge of the scroll display area 2c, followed by moving the character information of the head of the sentence leftward as time elapses, whereby the character information following to the character information of the head of the sentence is displayed on a right edge of the scroll display area 2c sequentially (refer to FIG. 21a).

Thereafter, when the character information of the head of the sentence moves to a left edge of the scroll display area 2c (refer to FIG. 21b), the character information of the head of the sentence disappears from the display in the scroll display area 2c, whereby subsequent character information is displayed on the left edge of the scroll display area 2c. The character information following to the character information of the head of the sentence is thus displayed on the left edge of the scroll display area 2c and disappears from the display sequentially, whereby the character information can be displayed to the end of the sentence in the scroll display area 2c even if the number of characters in text of a received electronic mail is larger than the number of characters displayable in the scroll display area 2c (refer to FIG. 21c).

If the number of characters in text of the received electronic mail is larger than the number of characters displayable in the scroll display area 2c, the character information of the head of the sentence disappears from the display in the scroll display area 2c, after which character information of the end of the sentence is displayed on the right edge of the scroll display area 2c, and at that point entire character information of full text is displayed in the scroll display area 2c. In contrast, if the number of characters in text of the received electronic mail is equal to or less than the number of characters displayable in the scroll display area 2c, the character information of the end of the sentence is displayed on a right edge of the scroll display area 2c before the character information of the head of the sentence disappears from the display in the scroll display area 2c, and at this point entire character information of text is displayed in the scroll display area 2c.

If the electronic mail is received in a state that the television images are displayed in the main display 2c, the character information including text of the received electronic mail can be thus subjected to the scroll display on the main display part 2a while maintaining display of the television images, whereby the user is allowed to browse through the character information including text of the received electronic mail while viewing the television broadcasts. Scroll display of the character information including text of the received mail on the main display part 2a allows display of full text of the electronic mail while ensuring a space for displaying the television images.

Accordingly, after confirming the character information including text of the received electronic mail by scroll display while viewing a television broadcast, and if the user desires to immediately browse through full text of the received electronic mail or create a reply electronic mail, the user carries out an operation to start an application. In contrast, if the user desires to give priority to view the television broadcasts, the user may keep viewing the television broadcasts without carrying out the aforementioned operation at that point, and start an application later.

FIG. 22 shows an example of an embodiment in which the application start part 53 starts an application in accordance with an operation made by the user after starting scroll display. If the user rotates the display case 3 from the laterally extended state to the longitudinally extended state at predetermined timing after starting scroll display, the main display part 2a is divided into the television image display area 2d and the mail display area 2e.

In the present embodiment, the television image display area 2d is arranged on an upper side of the main display part 2a disposed in the longitudinally extended state and the mail display area 2e is arranged on a lower side thereof. Since the television images have a laterally extended aspect ratio, the television images displayed on an upper side of the main display part 2a disposed in the longitudinally extended state creates an open space on a lower side thereof, in which the mail display area 2e can be arranged in the open space. It should be noted that the television image display area 2d may be arranged on a lower side and the mail display area 2e may be arranged on an upper side on the main display part 2a disposed in the longitudinally extended state.

In the television image display area 2d, the television images displayed in the television image display area 2b on the main display part 2a disposed in the laterally extended state until then are continuously displayed. A screen for browsing through the character information including text of the received electronic mail (refer to FIG. 22a), or a screen for creating a reply electronic mail to the received electronic mail (refer to FIG. 22b) is displayed in the mail display area 2e.

If the user rotates the display case 3 from the laterally extended state to the longitudinally extended state before the entire character information of text of the received electronic mail is subjected to the scroll display on the main display part 2a as shown in FIGS. 21a and 21b, a mail browsing application is started to display a mail browsing screen as shown in FIG. 22a on the main display part 2a. The mail display area 2e on this mail browsing screen displays an owner name or a mail address of an opposite communication terminal being a transmitting source of the received electronic mail, and the character information including text and a subject of the electronic mail created in the opposite communication terminal.

In the present embodiment, if a user rotates the display case 3 from the laterally extended state to the longitudinally extended state before the entire character information including text of the received electronic mail is subjected to the scroll display on the main display part 2a, the mail display area 2e displays the character information other than the character information already subjected to the scroll display on the main display part 2a, i.e. the character information following to the character information already subjected to the scroll display.

When, for example, an electronic mail including a series of text as shown in the scroll display part 2c of FIGS. 21a to 21c was received, and if the user rotated the display case 3 at the point of scroll display of text as shown in the state of FIG. 21a, the character information following to the character information already subjected to the scroll display is exclusively displayed in the mail display area 2e as shown in FIG. 22.

As stated above, if the user desires to immediately browse through full text of the received electronic mail in the middle of confirming the character information including text of the received electronic mail by scroll display while viewing the television broadcasts, the user carries out an operation to start the mail browsing application before the entire character information of text of the received electronic mail is subjected to the scroll display on the main display part 2a, whereby it is possible to browse through the character information other than the character information already subjected to the scroll display on the main display part 2a. Accordingly, browsing through full text of the received electronic mail can be realized in minimum display.

Meanwhile, if the user rotates the display case 3 from the laterally extended state to the longitudinally extended state within a fixed period of time after the entire character information of text of the received electronic mail is subjected to the scroll display on the main display part 2a as shown in FIG. 21c, the mail creating application is started to display a mail creation screen as shown in FIG. 22b is displayed on the main display part 2a. The mail display area 2e on this mail creation screen displays an owner name or a mail address of an opposite communication terminal being a transmitting destination of a reply electronic mail, and character information including text and a subject of an electronic mail created in this mobile phone 1.

At this time, a mail address of the opposite communication terminal being a transmitting source of the received electronic mail is automatically specified as a transmitting destination of a reply electronic mail, and a subject of the reply electronic mail is automatically created by setting "Re." added to the head of a subject of the received electronic mail. Accordingly, the user of the mobile phone 1 shall create only text of a reply electronic mail by operating the operation keys 4 after the mail creating application is started to display a mail creation screen on the main display part 2a. It should be noted that a subject of a reply electronic mail can be changed by operating the operation keys 4.

Information related to the television broadcast viewed by the user at the time of starting a mail creating application may be automatically integrated in text of a reply electronic mail. In this case, the character information such as a television program name included in the received television broadcast waves may be integrated in text of a reply electronic mail.

As stated above, if the user desires to create a reply electronic mail to a received electronic mail after confirming character information including text of the received electronic mail by scroll display while viewing the television broadcasts, the user carries out an operation to start the mail creating application within a fixed period of time after scroll display finishes, so as to create a reply electronic mail. Therefore, an operation to specify a mail address of a transmitting destination can be omitted and a reply electronic mail can be easily transmitted.

Figure 23:
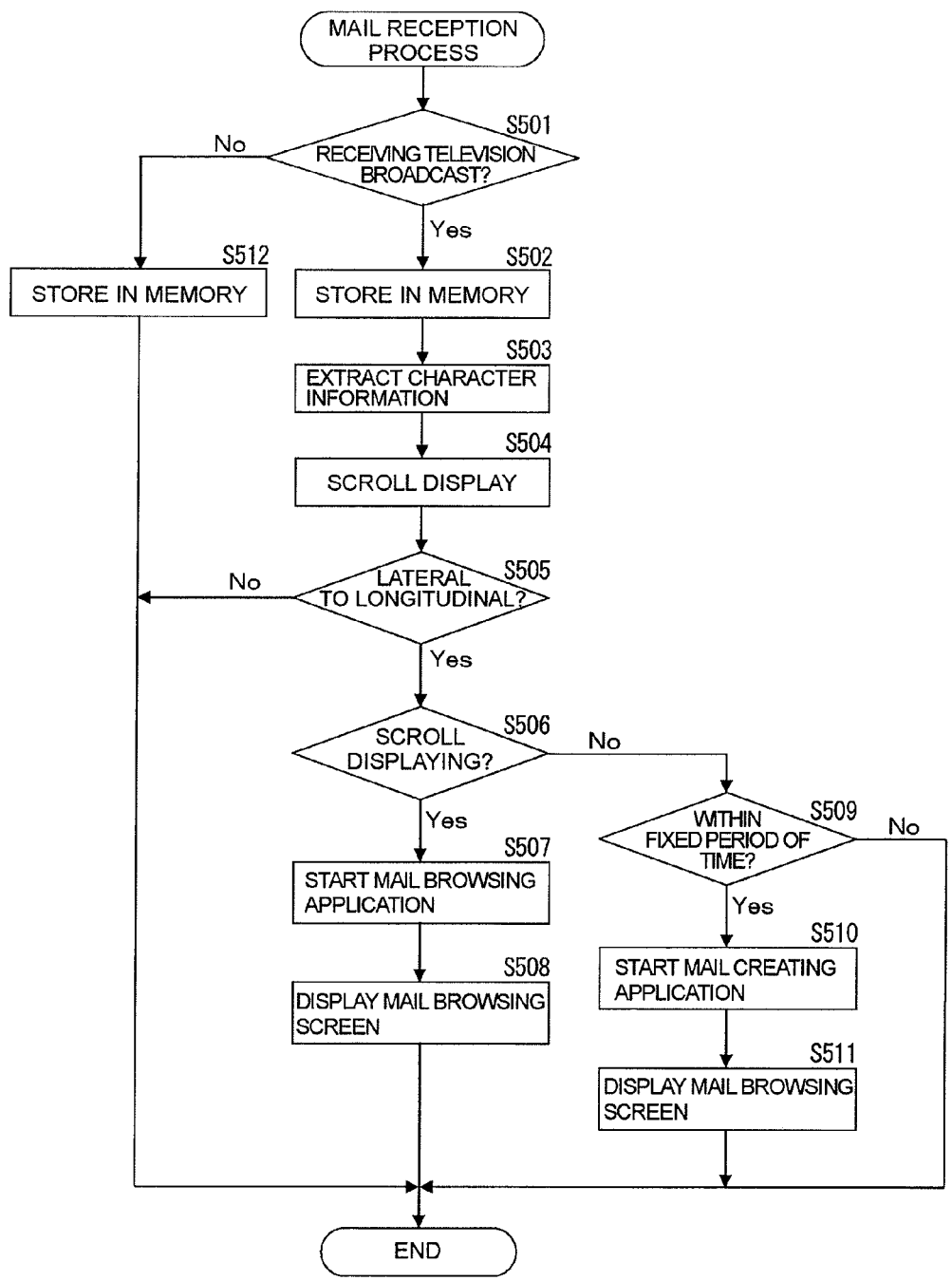
FIG. 23 is a flowchart showing an example of a process to receive an electronic mail when the mail is received while the display case should be in the laterally extended state.

FIG. 23 is a flowchart showing an example of a mail reception process which is carried out when an electronic mail is received while the display case 2 should be in the laterally extended state. When the electronic mail is received from the opposite communication terminal while the display case 2 should be in the laterally extended state, and if the television broadcast reception part 24 does not receive the television broadcast waves (No in step S501), mail information such as text and a subject of the received electronic mail and the mail address of the opposite communication terminal is stored in the memory 27 (step S512). At this time, the main display part 2a displays a notification that the electronic mail has been received, after which the user operates the operation keys 4 to read and browse through the mail information stored in the memory 27.

Meanwhile, if the television broadcast reception part 24 receives the television broadcast waves while the electronic mail is received from the opposite communication terminal when the display case 2 should be in the laterally extended state (Yes in step S501), mail information such as text and a subject of the received electronic mail and a mail address of the opposite communication terminal is stored in the memory 27 (step S502), and the character information extraction part 51 extracts character information of the text from the mail information (step S503). The main display part 2a is then divided into the television image display area 2b and the scroll display area 2c, where character information including text of an extracted electronic mail is subjected to the scroll display in the scroll display area 2c by the scroll display part 52 (step S504).

If the user carries out an operation to rotate the display case 3 from the laterally extended state to the longitudinally extended state after scroll display starts (Yes in step S505), and if the user carries out the operation before entire character information of text is subjected to the scroll display in the scroll display area 2c (Yes in step S506), the mail browsing application start part 53a starts the mail browsing application (step S507), so as to display the mail browsing screen as shown in FIG. 22a on the main display part 2a (step S508).

On the contrary, after entire character information of text is subjected to the scroll display in the scroll display area 2c (No in step S506), and if the user carries out an operation within a fixed period of time (Yes in step S509), the mail creating application start part 53b starts the mail creating application (step S510), and a mail creation screen as shown in FIG. 22b is displayed on the main display part 2a (step S511).

Although explanation was made in the present embodiment for the structure in which character information including text of a received electronic mail is subjected to the scroll display on the main display part 2a, such a structure in not limited and a structure to realize scroll display of a subject of a received electronic mail on the main display part 2a may also be employed. In this case, the scroll display may include a subject added to text of the received electronic mail on the main display part 2a, or an owner name or a mail address of the opposite communication terminal may be further added to the scroll display on the main display part 2a.

The present application claims priority under the Paris convention on the basis of a patent application filed on Nov. 22, 2005 (Japanese Patent Application No. 2005-336982), and other patent applications filed on Nov. 24, 2005 (Japanese Patent Application Nos. 2005-337937 and 2005-339458) in Japan, while entire contents of these Patent Applications are referred to and cited herein.

DESCRIPTION OF REFERENCE NUMERALS

1 Mobile phone
2 Display case
2a Main display part
4 Operation keys
4a Holding button
5 Operation case
23 Communication part
24 Television broadcast reception part
25 Rotational position detection part
30 Control part
31 Incoming call process part 32 Response part
33 Recording part
34 Television output part
35 Television image display part
36 Television audio output part
37 Image rotation part
38 Character information display part
39 Output selection part
41 Incoming call process part
42 Response part
43 Recording part
44 Television output part
45 Television image display part
46 Television audio output part
47 Image rotation part
48 Character information display part
51 Character information extraction part
52 Scroll display part
53 Application start part
53a Mail browsing application start part
53b Mail creating application start part
54 Television output part
55 Television image display part
56 Television audio output part
57 Image rotation part

The invention claimed is:

1. A mobile phone comprising:
television broadcast reception means adapted to receive a television broadcast wave;
television image display means adapted to display a television image on a display screen on the basis of the received television broadcast wave;
electronic mail reception means adapted to receive an electronic mail made of character information from a base station;
scroll display means adapted to provide scroll display of said character information of the electronic mail on a first display area of said display screen as time elapses when the electronic mail is received in a state that said television image display means displays the television image on the display screen;
mail browsing application start means adapted to start an application to browse through said character information of the received electronic mail on a second display area of said display screen when an operation is carried out by a user before the scroll display includes entire character information of the received electronic mail on said display screen; and
mail creating application start means adapted to start an application to create a reply electronic mail to the received electronic mail when said operation is carried out by the user within a fixed period of time after said entire character information of the received electronic mail is subjected to the scroll display on said display screen.

2. The mobile phone according to claim 1, wherein said mail browsing application start means starts an application to browse through said character information other than said character information already subjected to the scroll display on the first display area of said display screen.

3. The mobile phone according to claim 2, further comprising:
a display case created with a rectangular display screen;
holding means adapted to rotatably hold said display case within a face of horizontally disposing said display screen so that said display screen should be in a longitudinally extended state and a laterally extended state; and
rotational operation detection means adapted to detect a rotational operation of said display case by the user, wherein
said television image display means causes the display screen to display the television image rotated in accordance with said rotational operation; and
said mail browsing application start means starts an application on the basis of a rotational operation to make a transition of said display screen from the laterally extended state to the longitudinally extended state.

4. The mobile phone according to claim 3, wherein
said television image display means continuously displays the television image on one side of a longitudinal direction on said display screen disposed in the longitudinally extended state after said mail browsing application start means starts an application; and
said mail browsing application start means displays a screen to browse through an electronic mail on the other side of the longitudinal direction on said display screen.

5. The mobile phone according to claim 1, further comprising:
a display case created with a rectangular display screen;
holding means adapted to rotatably hold said display case within a face of horizontally disposing said display screen so that said display screen should be in a longitudinally extended state and a laterally extended state; and
rotational operation detection means adapted to detect a rotational operation of said display case by the user, wherein
said television image display means causes the display screen to display the television image rotated in accordance with said rotational operation; and
said mail creating application start means starts an application on the basis of a rotational operation to make a transition of said display screen from the laterally extended state to the longitudinally extended state.

6. The mobile phone according to claim 5, wherein said television image display means continuously displays the television image on one side of a longitudinal direction on said display screen disposed in the longitudinally extended state after said mail creating application start means starts an application; and
said mail creating application start means displays a screen to create an electronic mail on the other side of the longitudinal direction on said display screen.

* * * * *